US012776708B2

(12) United States Patent
Yanagida

(10) Patent No.: US 12,776,708 B2
(45) Date of Patent: Oct. 27, 2026

(54) SWITCHING DEVICE AND DC/DC CONVERTER

(71) Applicant: ROHM CO., LTD., Kyoto (JP)

(72) Inventor: Osamu Yanagida, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 28 days.

(21) Appl. No.: 18/886,171

(22) Filed: Sep. 16, 2024

(65) Prior Publication Data

US 2025/0007409 A1 Jan. 2, 2025

Related U.S. Application Data

(63) Continuation of application No. PCT/JP2023/002642, filed on Jan. 27, 2023.

(30) Foreign Application Priority Data

Mar. 23, 2022 (JP) ................................ 2022-046475

(51) Int. Cl.
*H02M 3/158* (2006.01)
*H02M 1/088* (2006.01)

(52) U.S. Cl.
CPC ........... *H02M 3/158* (2013.01); *H02M 1/088* (2013.01)

(58) Field of Classification Search
CPC .............................. H02M 3/158; H02M 1/088
See application file for complete search history.

(56) References Cited

U.S. PATENT DOCUMENTS

| | | | | |
|---|---|---|---|---|
| 10,637,348 | B1 * | 4/2020 | Wu | H03K 17/6871 |
| 11,552,549 | B2 * | 1/2023 | Lin | H02M 1/08 |
| 2008/0298101 | A1 | 12/2008 | Kim et al. | |
| 2016/0036328 | A1 | 2/2016 | Noh et al. | |
| 2017/0302178 | A1 * | 10/2017 | Bandyopadhyay | H02M 1/08 |
| 2018/0351539 | A1 * | 12/2018 | Petrina | H02M 1/08 |
| 2020/0127652 | A1 * | 4/2020 | Petrina | H03K 5/13 |
| 2020/0169174 | A1 * | 5/2020 | Wachi | H02M 1/088 |
| 2020/0252062 | A1 * | 8/2020 | Yamakoshi | H02M 1/088 |
| 2020/0313537 | A1 * | 10/2020 | Okawauchi | H02M 1/08 |

(Continued)

FOREIGN PATENT DOCUMENTS

| | | |
|---|---|---|
| JP | 2014-103485 | 6/2014 |
| JP | 2015-216818 A | 12/2015 |

OTHER PUBLICATIONS

International Search Report and Written Opinion in International Appln. No. PCT/JP2023/002642, mailed on Apr. 18, 2023, 13 pages (with machine translation).

(Continued)

*Primary Examiner* — Rafael O De Leon Domenech
(74) *Attorney, Agent, or Firm* — Fish & Richardson P.C.

(57) ABSTRACT

A first transistor and a second transistor disposed on the lower-potential side of the first transistor are connected in series with each other. Based on a level change in a drive control signal, the first transistor is turned on at the lapse of a first delay time and the second transistor is turned off at the lapse of a second delay time. Based on the gate signals to the first and second transistors, the turn-on timing of the first transistor and the turn-off timing of the second transistor are sensed. Based on the difference between those timings, at least one of the first and second delay times is changed to reduce a dead time.

10 Claims, 19 Drawing Sheets

(56) References Cited

U.S. PATENT DOCUMENTS

| | | | | |
|---|---|---|---|---|
| 2021/0083563 | A1* | 3/2021 | Okawauchi | H02M 1/08 |
| 2022/0321012 | A1* | 10/2022 | Chen | H02M 3/158 |
| 2026/0012171 | A1* | 1/2026 | Nam | H03K 17/162 |

OTHER PUBLICATIONS

JP OA—Japanese Patent Office, Office Action in Japanese Appln. No. 2024-509800, dated Aug. 18, 2026, 12 pages (with English Translation).

* cited by examiner

SWITCHING DEVICE AND DC/DC CONVERTER

CROSS-REFERENCE TO RELATED APPLICATIONS

This nonprovisional application is a continuation application of International Patent Application No. PCT/JP2023/002642 filed on Jan. 27, 2023, which claims priority to Japanese Patent Application No. 2022-046475 filed on Mar. 23, 2022, the entire contents of which are hereby incorporated by reference.

TECHNICAL FIELD

The present disclosure relates to switching devices and DC/DC converters.

BACKGROUND ART

According to a known switching method, a half-bridge circuit having a first and a second transistor is fed with an input voltage and the first and second transistors are turned on alternately. In this type of switching method, a simultaneous turning-on of the first and second transistors is prevented by the provision of a dead time in which the first and second transistors are both off (see, e.g., Patent Document 1 identified below)

CITATION LIST

Patent Literature

Patent Document 1: JP-A-2014-103485

DESCRIPTION OF EMBODIMENTS

Figure 1:
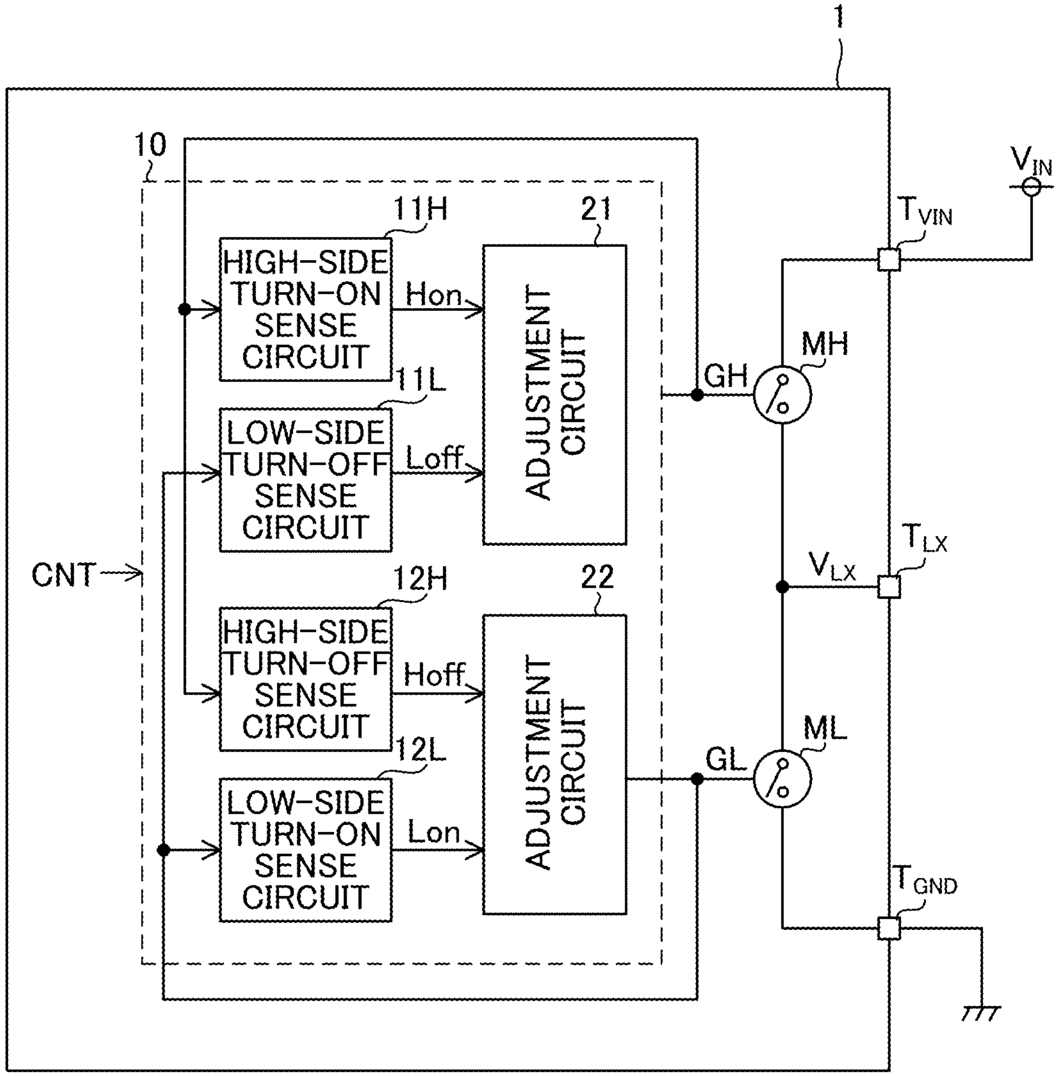
FIG. 1 is a diagram showing an outline of a configuration of a switching IC according to an embodiment of the present disclosure.

Examples of implementing the present disclosure will be described below specifically with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, elements, parts, and the like are occasionally used with omission or abbreviation of the names of the information, signals, physical quantities, elements, parts, and the like corresponding to those symbols and reference signs.

First, some of the terms used to describe embodiments of the present disclosure will be defined. "IC" is an abbreviation of "integrated circuit". "Ground" denotes a reference conductor at a reference potential of 0 V (zero volts), or to a potential of 0 V itself. A reference conductor can be formed of an electrically conductive material such as metal. A potential of 0 V is occasionally referred to as a ground potential. In embodiments of the present disclosure, any voltage mentioned with no particular reference mentioned is a potential relative to the ground.

"Level" denotes the level of a potential, and for any signal or voltage of interest, "high level" is a potential higher than "low level". For any signal or voltage of interest, its being at high level means, more precisely, its level being equal to high level, and its being at low level means, more precisely, its level being equal to low level. A level with respect to a signal is occasionally referred to as a signal level, and a level with respect to a voltage is occasionally referred to as a voltage level. For any signal of interest, if the signal is at high level, its inversion signal is at low level, and if the signal is at low level, its inversion signal is at high level. For any signal that takes as its signal level either high or low level, a period in which the signal takes as its level high level is referred to as a high-level period, and a period in which the signal takes as its level low level is referred to as a low-level period. Similar definitions apply to any voltage that takes as its voltage level either high or low level.

For any signal or voltage of interest, a switch from low level to high level is termed an up edge and the timing of a switch from low level to high level is termed an up edge timing. "Up edge" can be read as "rising edge". Likewise, for any signal or voltage of interest, a switch from high level to low level is termed a down edge and the timing of a switch from high level to low level is termed a down edge timing. "Down edge" can be read as "falling edge".

For any transistor configured as an FET (field-effect transistor), which can be a MOSFET, "on state" refers to a state where the transistor is conducting between its drain and source, and "off state" refers to a state where the transistor is not conducting (is cut off) between its drain and source. Similar definitions apply to any transistor that is not classified as an FET. Unless otherwise stated, any MOSFET can be understood to be an enhancement MOSFET. "MOSFET" is an abbreviation of "metal-oxide-semiconductor field-effect transistor". Unless otherwise stated, for any MOSFET, its back gate can be understood to be short-circuited to its source.

The electrical characteristics of a MOSFET include the gate threshold voltage. For any transistor that is an N-channel enhancement MOSFET, when the gate potential of the transistor is higher than the source potential of the transistor and the magnitude of the gate-source voltage of the transistor is equal to or higher than the gate threshold voltage of the transistor, the transistor is in the on state; otherwise, the transistor is in the off state. The gate-source voltage denotes the gate potential relative to the source potential. For any transistor that is a P-channel enhancement MOSFET, when the gate potential of the transistor is lower than the source potential of the transistor and the magnitude of the gate-source voltage of the transistor is equal to or higher than the gate threshold voltage of the transistor, the transistor is in the on state; otherwise, the transistor is in the off state.

For any MOSFET, the gate threshold voltage is defined to be the gate-source voltage that is needed to pass a drain current of a predetermined magnitude with a predetermined voltage applied between the drain and the source of the MOSFET, under a predetermined ambient temperature environment. While this definition of gate threshold voltage focuses on a MOSFET, a similar definition applies to an insulated-gate bipolar transistor (IGBT) and the like. "IGBT" is an abbreviation of "insulated-gate bipolar transistor".

In the following description, for any transistor, its being in the on or off state is occasionally expressed simply as its being on or off respectively. For any transistor, a switch from the off state to the on state is referred to as a turn-on (turning-on), and a switch from the on state to the off state is referred to as a turn-off (turning-off).

Unless otherwise stated, wherever "connection" is mentioned among a plurality of parts constituting a circuit, as among given circuit elements, wirings, nodes, and the like, the term is to be understood to denote "electrical connection".

Figure 2:
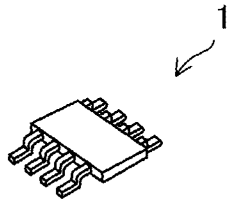
FIG. 2 is an exterior perspective view of a switching IC according to an embodiment of the present disclosure.

An embodiment of the present disclosure will be described. FIG. 1 is a diagram showing an outline of the overall configuration of a switching IC 1 according to the embodiment of the present disclosure. FIG. 2 is an exterior perspective view of the switching IC 1. The switching IC 1 is an electronic component that includes a semiconductor chip having a semiconductor integrated circuit formed on a semiconductor substrate, a package (case) that houses the semiconductor chip, and a plurality of external terminals exposed out of the package to outside the switching IC 1. Sealing the semiconductor chip in the package (case) formed of resin yields the switching IC 1. The number of external terminals, and the type of package, of the switching IC 1 shown in FIG. 2 are merely illustrative, and can be designed as desired.

FIG. 1 shows, as some of the plurality of external terminals provided in the switching IC 1, terminals $T_{VIN}$, $T_{LX}$, and $T_{GND}$. The terminal $T_{VIN}$ is a power input terminal for receiving an input voltage $V_{IN}$. The input voltage $V_{IN}$ is fed to the power input terminal $T_{VIN}$ from an unillustrated voltage source provided outside the switching IC 1. The input voltage $V_{IN}$ has a predetermined positive direct-current voltage value. The individual circuits (including a switching control circuit 10) within the switching IC 1 operate from the input voltage $V_{IN}$ or from a supply voltage different from the input voltage $V_{IN}$. The terminal $T_{GND}$ is a ground terminal and is connected to a ground at a potential of 0 V. A sense resistor (unillustrated) can be inserted between the terminal $T_{GND}$ and the ground. The terminal $T_{LX}$ is a switching terminal. The switching terminal $T_{LX}$ will be described later.

The switching IC 1 includes transistors MH and ML, which are switching elements, and a switching control circuit 10. The transistors MH and ML are connected in series with each other. The series circuit of the transistors MH and ML is provided between the terminals $T_{VIN}$ and $T_{GND}$. The transistor MH is a high-side transistor (high-side switching element) disposed on the higher-potential side of the transistor ML, and the transistor ML is a low-side transistor (low-side switching element) disposed on the lower-potential side of the transistor MH.

The transistors MH and ML each have a first electrode, a second electrode, and a control electrode. The control electrode is a gate. For example, if the transistor MH or ML is an FET (field-effect transistor), of the first and second electrodes, one is a drain and the other is a source. In this case, the FET is on or off according to its gate-source voltage (the gate potential relative to the source potential). For another example, if the transistor MH or ML is an IGBT, of the first and second electrodes, one is a collector and the other is an emitter. The IGBT is on or off according to its gate-emitter voltage (the gate potential relative to the emitter potential).

Of the first and second electrodes of the transistor MH, one is connected to the power input terminal $T_{VIN}$ to receive the input voltage $V_{IN}$ and the other is connected to the switching terminal $T_{LX}$. Of the first and second electrodes of the transistor ML, one is connected to the switching terminal $T_{LX}$ and the other is connected to the ground terminal $T_{GND}$. The voltage at the switching terminal $T_{LX}$ will be identified by the symbol "$V_{LX}$".

The switching control circuit 10 is fed with a drive control signal CNT. The drive control signal CNT is a binary signal that takes as its level either high or low level. The level of the drive control signal CNT alternates between high and low levels repeatedly. The drive control signal CNT can be generated within the switching IC 1, or can be generated in an external circuit (unillustrated) provided outside the switching IC 1. In the latter case, an external terminal for receiving the drive control signal CNT is provided in the switching IC 1, and the drive control signal CNT is fed from the external circuit to the switching IC 1.

The switching control circuit 10 generates gate signals GH and GL based on the drive control signal CNT, and feeds the gate signal GH to the gate of the transistor MH and the gate signal GL to the gate of the transistor ML. According to the gate signal GH, the transistor MH is on or off and, according to the gate signal GL, the transistor ML is on or off. The switching control circuit 10 turns the transistor MH on or off by feeding its gate with the gate signal GH, and turns the transistor ML on or off by feeding its gate with the gate signal GL.

The transistors MH and ML constitute a half-bridge circuit. A state of the half-bridge circuit in which the transistor MH is on and the transistor ML is off will be referred to as an output-high state, and a period in which the output-high state is in effect will be referred to as an output-high period. A state of the half-bridge circuit in which the transistor MH is off and the transistor ML is on will be referred to as an output-low state, and a period in which the output-low state is in effect will be referred to as an output-low period. A state of the half-bridge circuit in which the transistors MH and ML are both off will be referred to as a both-off state, and a period in which the both-off state is in effect will be referred to as a both-off period. In the switching IC 1, there is no period in which the transistors MH and ML are both on simultaneously.

In response to a change of the level of the drive control signal CNT, the half-bridge circuit (MH, ML) alternates between the output-high and output-low states. Note however that a switch from the output-high state to the output-low state normally proceeds from the output-high state via the both-off state to the output-low state and that a switch from the output-low state to the output-high state normally proceeds from the output-low state via the both-off state to the output-high state. The both-off state itself as well as its length in time is termed the dead time.

Figure 3:
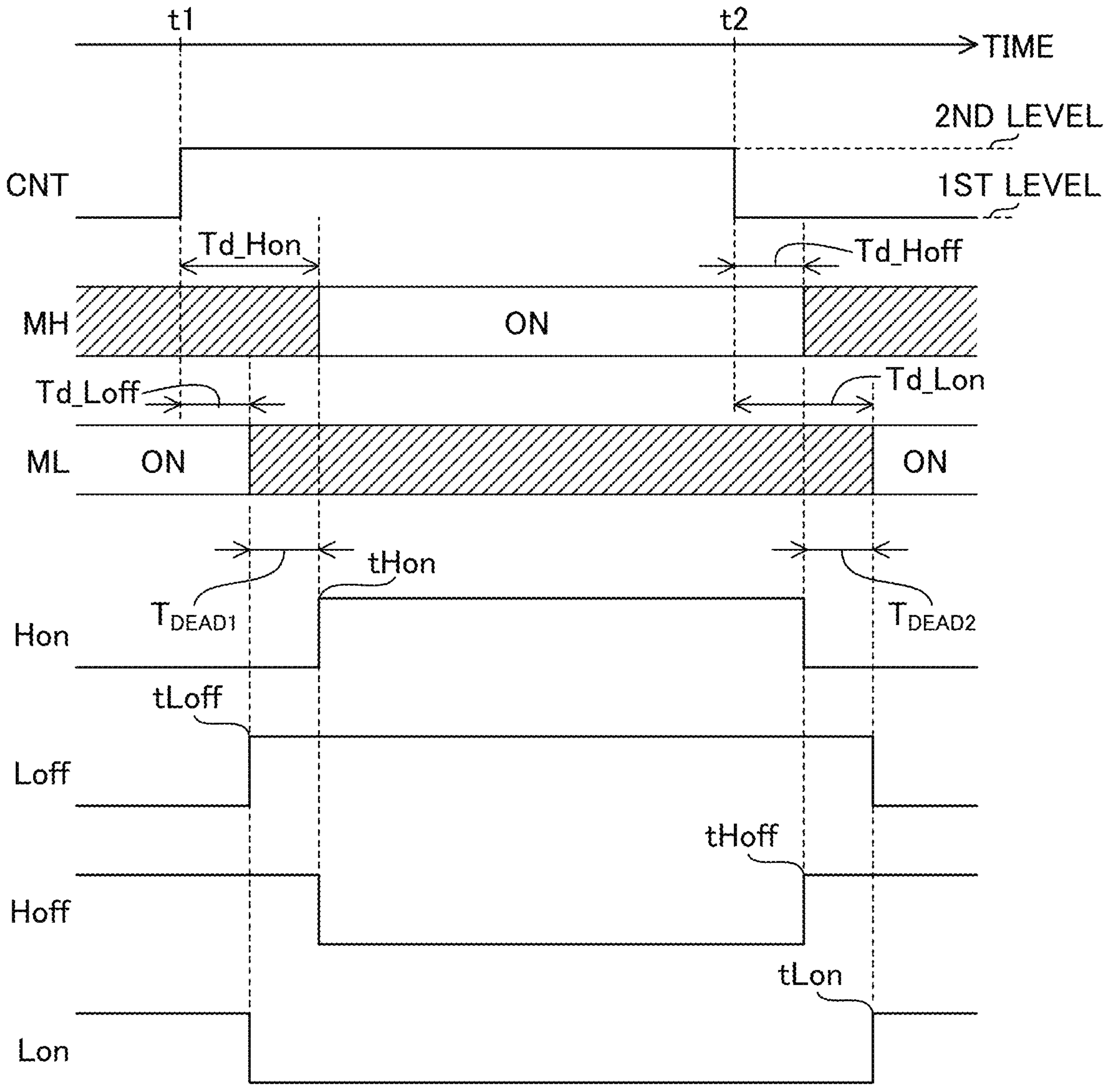
FIG. 3 is a diagram showing a relationship among a drive control signal, the states of transistors, and a plurality of signals according to an embodiment of the present disclosure.

FIG. 3 schematically shows the relationship of the level of the drive control signal CNT with the states of the transistors MH and ML along with relevant events. It is here assumed that at time point t1 the level of the drive control signal CNT changes from a first level to a second level and, after that, at time point t2 the level of the drive control signal CNT changes from the second level to the first level.

In response to the change of the level of the drive control signal CNT from the first level to the second level, at the lapse of a delay time Td_Hon after that, the switching control circuit 10 turns on the transistor MH; in response to the change of the level of the drive control signal CNT from the first level to the second level, at the lapse of a delay time Td_Loff after that, the switching control circuit 10 turns off the transistor ML. That is, the switching control circuit 10 generates the gate signal GH such that, at a time point later than time point t1 by the delay time Td_Hon, the transistor MH switches from off to on, and generates the gate signal GL such that, at a time point later than time point t1 by the delay time Td_Loff, the transistor ML switches from on to off.

In response to the change of the level of the drive control signal CNT from the second level to the first level, at the lapse of a delay time Td_Hoff after that, the switching control circuit 10 turns off the transistor MH; in response to the change of the level of the drive control signal CNT from the second level to the first level, at the lapse of a delay time Td_Lon after that, the switching control circuit 10 turns on the transistor ML. That is, the switching control circuit 10 generates the gate signal GH such that, at a time point later than time point t2 by the delay time Td_Hoff, the transistor MH switches from on to off, and generates the gate signal GL such that, at a time point later than time point t2 by the delay time Td_Lon, the transistor ML switches from off to on.

With respect to the level of the drive control signal CNT, it does not matter which of the first and second levels is high level. The following description assumes that the first level is low level and that the second level is high level.

The switching control circuit 10 includes circuits 11H, 11L, 12H, 12L, 21, and 22 (see FIG. 1). The circuits 11H and 12H are connected to the gate of the transistor MH (in other words, connected to a wiring that is fed with the gate signal GH) to receive the gate signal GH. The circuits 11L and 12L are connected to the gate of the transistor ML (in other words, connected to a wiring that is fed with the gate signal GL) to receive the gate signal GL. The circuits 11H, 11L, 12H, and 12L output signals Hon, Loff, Hoff, and Lon respectively. The signals Hon, Loff, Hoff, and Lon each have a value (logical value) of "0" or "1". It is here assumed that, for each of the signals Hon, Loff, Hoff, and Lon, the logic value "1" corresponds to high level and that the logic value "0" corresponds to low level.

The circuit 11H is a high-side turn-on sense circuit; it senses, based on the gate signal GH, the timing that the transistor MH turns on and outputs the signal Hon as a binary signal indicating the sensing result. When the circuit 11H senses the transistor MH switching from off to on, at this timing of sensing, the circuit 11H produces an up edge in the signal Hon (see FIG. 3). Thus, the up edge timing of the signal Hon indicates the turn-on timing of the transistor MH (more specifically, the timing that the transistor MH is sensed to turn on), and at the time point later than the time point t1 by the delay time Td_Hon, an up edge occurs in the signal Hon. Note that, when the transistor MH turns off, a down edge occurs in the signal Hon. In the following description, the up edge timing of the signal Hon is identified by the symbol "tHon" and is occasionally referred to as the edge timing tHon or the timing tHon.

The circuit 11L is a low-side turn-off sense circuit; it senses, based on the gate signal GL, the timing that the transistor ML turns off and outputs the signal Loff as a binary signal indicating the sensing result. When the circuit 11L senses the transistor ML switching from on to off, at this timing of sensing, the circuit 11L produces an up edge in the signal Loff (see FIG. 3). Thus, the up edge timing of the signal Loff indicates the turn-off timing of the transistor ML (more specifically, the timing that the transistor ML is sensed to turn off), and at the time point later than time point t1 by the delay time Td_Loff, an up edge occurs in the signal Loff. Note that, when the transistor ML turns on, a down edge occurs in the signal Loff. In the following description, the up edge timing of the signal Loff is identified by the symbol "tLoff" and is occasionally referred to as the edge timing tLoff or the timing tLoff.

The circuit 12H is a high-side turn-off sense circuit; it senses, based on the gate signal GH, the timing that the transistor MH turns off and outputs the signal Hoff as a binary signal indicating the sensing result. When the circuit 12H senses the transistor MH switching from on to off, at this timing of sensing, the circuit 12H produces an up edge in the signal Hoff (see FIG. 3). Thus, the up edge timing of the signal Hoff indicates the turn-off timing of the transistor MH (more specifically, the timing that the transistor MH is sensed to turn off), and at the time point later than time point t2 by the delay time Td_Hoff, an up edge occurs in the signal Hoff. Note that, when the transistor MH turns on, a down edge occurs in the signal Hoff. In the following description, the up edge timing of the signal Hoff is identified by the symbol "tHoff" and is occasionally referred to as the edge timing tHoff or the timing tHoff.

The circuit 12L is a low-side turn-on sense circuit; it senses, based on the gate signal GL, the timing that the transistor ML turns on and outputs the signal Lon as a binary signal indicating the sensing result. When the circuit 12L senses the transistor ML switching from off to on, at this timing of sensing, the circuit 12L produces an up edge in the signal Lon (see FIG. 3). Thus, the up edge timing of the signal Lon indicates the turn-on timing of the transistor ML (more specifically, the timing that the transistor ML is sensed to turn on), and at the time point later than time point t2 by the delay time Td_Lon, an up edge occurs in the signal Lon. Note that, when the transistor ML turns off, a down edge occurs in the signal Lon. In the following description, the up edge timing of the signal Lon is identified by the symbol "tLon" and is occasionally referred to as the edge timing tLon or the timing tLon.

An adjustment circuit 21 is fed with the signals Hon and Loff. Based on the signals Hon and Loff, the adjustment circuit 21 can adjust at least one of the delay times Td_Hon and Td_Loff (that is, it can increase or decrease at least one of the delay times Td_Hon and Td_Loff).

For example, a first delay adding circuit can be inserted in the circuit that generates the gate signal GH for turning on the transistor MH in response to an up edge in the drive control signal CNT so that the transmission of the up edge in the drive control signal CNT to the subsequent-stage circuit can be delayed by a first variable delay time by the first delay adding circuit. Increasing and decreasing the first variable delay time based on the signals Hon and Loff permits the delay time Td_Hon to be increased and decreased. Likewise, for example, a second delay adding circuit can be inserted in the circuit that generates the gate signal GL for turning off the transistor ML in response to an up edge in the drive control signal CNT so that the transmission of the up edge of the drive control signal CNT to the subsequent-stage circuit can be delayed by a second variable delay time by the second delay adding circuit. Increasing and decreasing the second variable delay time based on the signals Hon and Loff permits the delay time Td_Loff to be increased and decreased.

An adjustment circuit 22 is fed with the signals Hoff and Lon. Based on the signals Hoff and Lon, the adjustment circuit 22 can adjust at least one of the delay times Td_Hoff and Td_Lon (that is, it can increase or decrease at least one of the delay times Td_Hoff and Td_Lon).

For example, a third delay adding circuit can be inserted in the circuit that generates the gate signal GH for turning off the transistor MH in response to a down edge in the drive control signal CNT so that the transmission of the down edge in the drive control signal CNT to the subsequent-stage circuit can be delayed by a third variable delay time by the third delay adding circuit. Increasing and decreasing the third variable delay time based on the signals Hoff and Lon permits the delay time Td_Hoff to be increased and decreased. Likewise, for example, a fourth delay adding circuit can be inserted in the circuit that generates the gate signal GL for turning on the transistor ML in response to a down edge in the drive control signal CNT so that the transmission of the down edge of the drive control signal CNT to the subsequent-stage circuit can be delayed by a fourth variable delay time by the fourth delay adding circuit. Increasing and decreasing the fourth variable delay time based on the signals Hoff and Lon permits the delay time Td_Lon to be increased and decreased.

When a transition takes place from a state where the switching IC 1 is not supplied with the input voltage $V_{IN}$ to a state where the switching IC 1 is supplied with the input voltage $V_{IN}$, the switching IC 1 starts up. The state of the delay times Td_Hon, Td_Loff, Td_Hoff, and Td_Lon immediately after the start-up of the switching IC 1 will be referred to as the initial delay state. The switching IC 1 is configured so as to ensure that, in the initial delay state, the delay time Td_Hon is longer than the delay time Td_Loff and the delay time Td_Lon is longer than the delay time Td_Hoff.

The time that elapses, in response to the change of the level of the drive control signal CNT from the first level to the second level, after the transistor ML turns off until the transistor MH turns on is referred to as the first dead time and is identified by the symbol "$T_{DEAD1}$". The first dead time $T_{DEAD1}$ corresponds to the time from the up edge timing tLoff of the signal Loff to the up edge timing tHon of the signal Hon.

The time that elapses, in response to the change of the level of the drive control signal CNT from the second level to the first level, after the transistor MH turns off until the transistor ML turns on is referred to as the second dead time and is identified by the symbol "$T_{DEAD2}$". The second dead time $T_{DEAD2}$ corresponds to the time from the up edge timing tHoff of the signal Hoff to the up edge timing tLon of the signal Lon.

The adjustment circuit 21 can perform first dead time reducing operation for decreasing the first dead time $T_{DEAD1}$, based on the difference between the up edge timing tHon of the signal Hon and the up edge timing tLoff of the signal Loff, that is, based on the difference between the edge timings tHon and the tLoff. Thus, the adjustment circuit 21 can be called the first dead time adjustment circuit. The adjustment circuit 21 involved in the first dead time reducing operation decreases the first dead time $T_{DEAD1}$ by varying, starting with the initial delay state, at least one of the delay times Td_Hon and Td_Loff based on the difference between the edge timings tHon and the tLoff.

The adjustment circuit 22 can perform second dead time reducing operation or decreasing the second dead time $T_{DEAD2}$, based on the difference between the up edge timing tHoff of the signal Hoff and the up edge timing tLon of the signal Lon, that is, based on the difference between the edge timings tHoff and the tLon. Thus, the adjustment circuit 22 can be called the second dead time adjustment circuit. The adjustment circuit 22 involved in the second dead time reducing operation decreases the second dead time $T_{DEAD2}$ by varying, starting with the initial delay state, at least one of the delay times Td_Hoff and Td_Lon based on the difference between the edge timings tHoff and the tLon.

Figure 4:
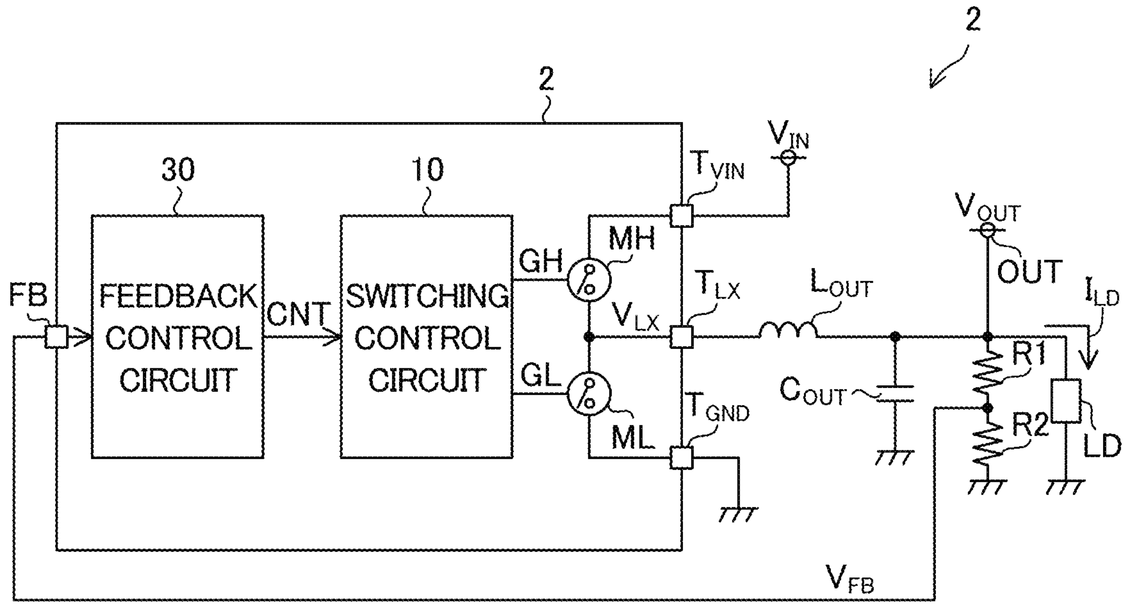
FIG. 4 is a diagram schematically showing a configuration of a DC/DC converter according to an embodiment of the present disclosure.

FIG. 4 is a diagram showing the configuration of a DC/DC converter 2 as an example of a device that incorporates the switching IC 1.

The DC/DC converter 2 is configured as a buck (step-down) DC/DC converter that performs power conversion on the input voltage $V_{IN}$ to produce an output voltage $V_{OUT}$ lower than the input voltage $V_{IN}$. The input voltage $V_{IN}$ and the output voltage $V_{OUT}$ are positive direct-current voltages. The DC/DC converter 2 includes the switching IC 1, a coil $L_{OUT}$, a capacitor $C_{OUT}$, and resistors R1 and R2. The switching IC 1 incorporated in the DC/DC converter 2 includes, in addition to the transistors MH and ML and the switching control circuit 10 described above, a feedback control circuit 30.

As a result of the transistors MH and ML being turned on alternately according to the drive control signal CNT, at the switching terminal $T_{LX}$ appears, as a voltage $V_{LX}$, a voltage with a rectangular waveform that varies generally between the input voltage $V_{IN}$ and the ground potential. The voltage ($V_{LX}$) with a rectangular waveform at the switching terminal $T_{LX}$ is rectified and smoothed by a rectifying-smoothing circuit composed of the coil $L_{OUT}$ and the capacitor $C_{OUT}$ to produce the output voltage $V_{OUT}$. Specifically, In the DC/DC converter 2, one terminal of the coil $L_{OUT}$ is connected to the switching terminal $T_{LX}$ and the other terminal of the coil $L_{OUT}$ is connected to an output terminal OUT. The output terminal OUT is connected via the capacitor $C_{OUT}$ to the ground. At the output terminal OUT appears the output voltage $V_{OUT}$. The output terminal OUT is connected to one terminal of the resistor R1 and the other terminal of the resistor R1 is connected via the resistor R2 to the ground. Thus, at the connection node between the resistors R1 and R2 appears a feedback voltage $V_{FB}$ proportional to the output voltage $V_{OUT}$. In the DC/DC converter 2, the switching IC 1 is provided with, as one external terminal, a feedback terminal FB for receiving the feedback voltage $V_{FB}$.

The feedback control circuit 30 generates based on the feedback voltage $V_{FB}$ the drive control signal CNT so as to stabilize the output voltage $V_{OUT}$ at a predetermined target voltage. The feedback control circuit 30 can, in generating the drive control signal CNT, also refer to the result of sensing the current through the coil $L_{OUT}$. The feedback control circuit 30 can generate the drive control signal CNT by, for example, pulse-width modulation, in which case the drive control signal CNT is a rectangular-wave signal with a predetermined switching frequency.

To the output terminal OUT of the DC/DC converter 2, a load LD is connected. The load LD can be any load that operates from the output voltage $V_{OUT}$. The load LD draws its consumption current from the switching terminal $T_{LX}$ through the coil $L_{OUT}$. The current consumed by the load LD will in the following description be referred to as the load current $I_{LD}$. In the DC/DC converter 2 of this type, improvement of efficiency (power conversion efficiency) is of great significance.

On the other hand, as a method for avoiding a simultaneous turning-on of the high-side and low-side transistors, a first reference method and a second reference method as described above are worth studying.

According to the first reference method, a predetermined delay is added to a signal indicating the sensing of a turn-off of the high-side transistor and then the low-side transistor is turned on, and in addition a delay is added to a signal indicating the sensing of a turn-off of the low-side transistor and then the high-side transistor is turned on. The first reference method does serve to avoid a simultaneous turning-on but leaves concern for diminished efficiency.

According to the second reference method, a gate signal for the high-side transistor is generated based on a signal resulting from adding a delay corresponding to a first fixed amount of delay to the drive control signal CNT and a gate signal for the low-side transistor is generated based on a signal resulting from adding a delay corresponding to a second fixed amount of delay to the drive control signal CNT. The second reference method too serve to avoid a simultaneous turning-on. However, with the second reference method, it is difficult to optimize efficiency under varying conditions. More specifically, the DC/DC converter 2, and any DC/DC converter like the DC/DC converter 2, can operate in a CCM (continuous conduction mode) region or a DCM (discontinuous conduction mode) region. It operates in the CCM region when the load LD consumes comparatively high electric power and operates in the DCM region when the load LD consumes comparatively low electric power as when the load LD is in a sleep mode. With the second reference method, the optimal amount of delay in the CCM region is adjusted to the fixed amounts of delay mentioned above, and this results in lower efficiency in the DCM region.

With the switching IC 1 according to this embodiment, through the dead time reducing operations, it is possible to optimize the efficiency of the DC/DC converter 2 under varying conditions. Moreover, not only in DC/DC converters but in any devices that incorporate the switching IC 1, it is possible, through reduction of dead times, to optimize efficiency (in other words, to reduce loss).

Some specific examples of operation in connection with the switching IC 1 will be described below by way of a plurality of practical examples, along with applied technologies, modified technologies, and the like. Unless otherwise stated or unless inconsistent, any features described in connection with the embodiment above are applicable to the practical examples described below. For any features of the practical examples that contradict with what has been described above, their description given in connection with the practical examples can prevail. Unless inconsistent, any feature of any of the plurality of practical examples described below is applicable to any other of the practical examples (i.e., two or more of the plurality of practical examples can be implemented in combination).

Practical Example EX1_A

Figure 5:
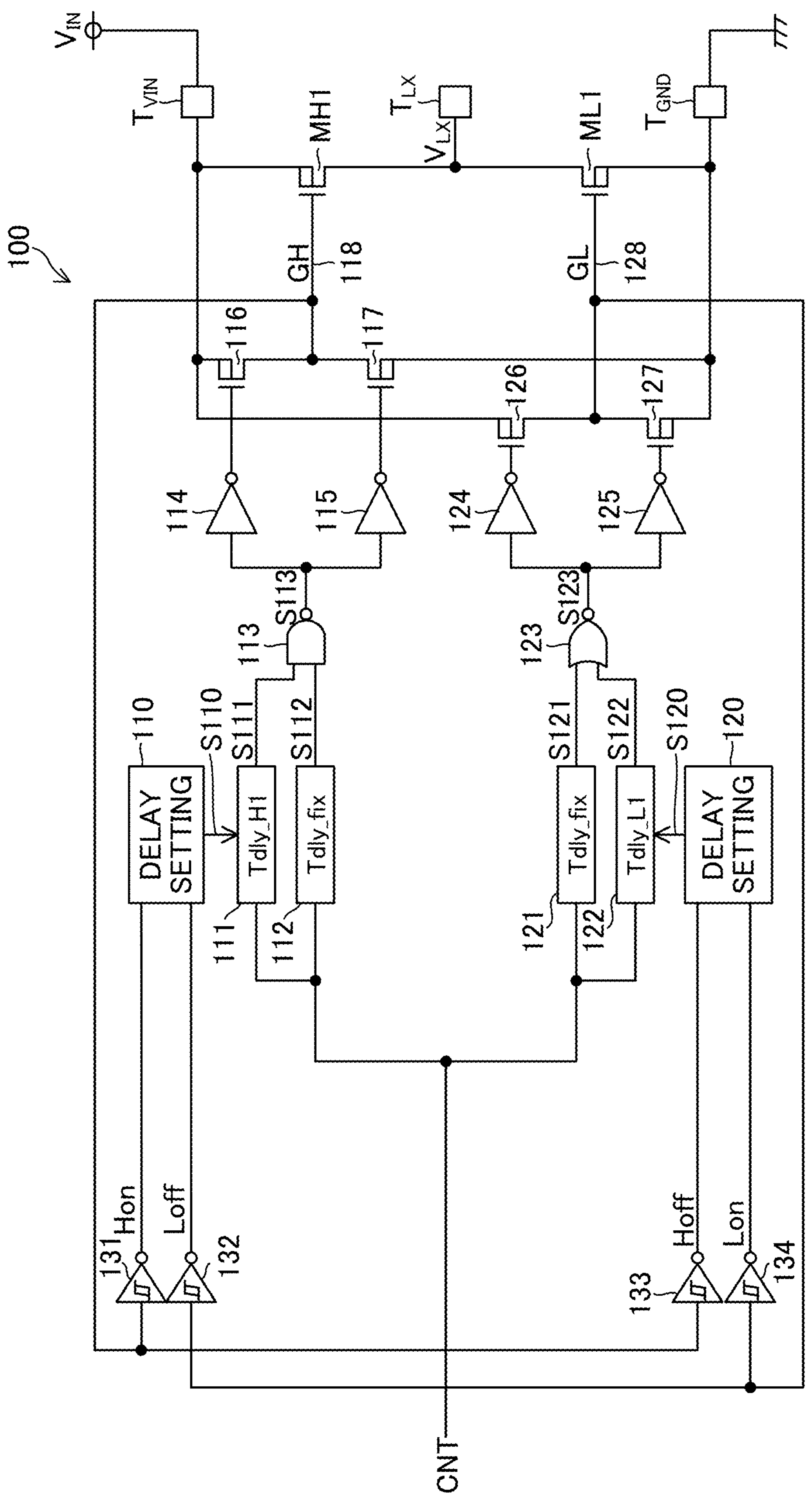
FIG. 5 is a diagram showing a configuration of a switching control circuit according to Practical Example EX1_A of the present disclosure.

Practical Example EX1_A will be described. FIG. 5 shows part of the internal circuit of a switching IC 1 according to Practical Example EX1_A. In the switching IC 1 of Practical Example EX1_A, the switching control circuit 10 (see FIG. 1) appears as a switching control circuit 100 and the transistors MH and ML appear as transistors MH1 and ML1 respectively. The transistor MH1 is configured as a P-channel MOSFET and the transistor ML1 is configured as an N-channel MOSFET.

The source of the transistor MH1 is connected to the power input terminal $T_{VIN}$ to receive the input voltage $V_{IN}$. The drain of the transistor MH1 is connected to the switching terminal $T_{LX}$. The drain of the transistor ML1 is connected to the switching terminal $T_{LX}$. Thus, the drains of the transistors MH1 and ML1 are connected together at the switching terminal $T_{LX}$. The source of the transistor ML1 is connected to the ground terminal $T_{GND}$ to be connected via the ground terminal $T_{GND}$ to the ground. In Practical Example EX1_A, the gate signals GH and GL refer to the gate signals that are fed to the gates of the transistors MH1 and ML1 respectively (a similar definition applies to Practical Examples EX1_B and EX1_C described later).

The switching control circuit 100 includes circuits or elements identified by the reference signs 110 to 117, 120 to 127, and 131 to 134.

The circuits 110 to 115, 120 to 125, and 131 to 134 are digital or analog circuits that operate from the input voltage $V_{IN}$, or an internal supply voltage different from the input voltage $V_{IN}$, relative to the ground potential. The internal supply voltage has a predetermined positive direct-current voltage value. The internal supply voltage can be generated based on the input voltage $V_{IN}$ by an internal power supply circuit (unillustrated) within the switching IC 1. The output signals of the circuits 111 to 115, 121 to 125, and 131 to 134 are each a binary signal that takes either high or low level. The transistors 116 and 126 are P-channel MOSFETs and the transistors 117 and 127 are N-channel MOSFETs.

The circuits 111, 112, 121, and 122 are delay adding circuits. The delay adding circuits 111, 112, 121, and 122 are each fed with the drive control signal CNT. The delay adding circuits 111, 112, 121, and 122 add to the drive control signal CNT delays with delay times Tdly_H1, Tdly_fix, Tdly_fix, and Tdly_L1 respectively and output the so delayed signals. The delay times Tdly_H1, Tdly_fix, and Tdly_L1 are delay times that are added purposefully and thus can be called added delay times or inserted delay times.

The delay adding circuit 111 outputs as a signal S111 a signal resulting from delaying the drive control signal CNT by the delay time Tdly_H1. Accordingly, at a timing later by the delay time Tdly_H1 than the up edge timing of the drive control signal CNT, an up edge occurs in the signal S111. Likewise, at a timing later by the delay time Tdly_H1 than the down edge timing of the drive control signal CNT, a down edge occurs in the signal S111.

The delay adding circuit 112 outputs as a signal S112 a signal resulting from delaying the drive control signal CNT by the delay time Tdly_fix. Accordingly, at a timing later by the delay time Tdly_fix than the up edge timing of the drive control signal CNT, an up edge occurs in the signal S112. Likewise, at a timing later by the delay time Tdly_fix than the down edge timing of the drive control signal CNT, a down edge occurs in the signal S112.

The delay adding circuit 121 outputs as a signal S121 a signal resulting from delaying the drive control signal CNT by the delay time Tdly_fix. Accordingly, at a timing later by the delay time Tdly_fix than the up edge timing of the drive control signal CNT, an up edge occurs in the signal S121. Likewise, at a timing later by the delay time Tdly_fix than the down edge timing of the drive control signal CNT, a down edge occurs in the signal S121.

The delay adding circuit 122 outputs as a signal S122 a signal resulting from delaying the drive control signal CNT by the delay time Tdly_L1. Accordingly, at a timing later by the delay time Tdly_L1 than the up edge timing of the drive control signal CNT, an up edge occurs in the signal S122. Likewise, at a timing later by the delay time Tdly_L1 than the down edge timing of the drive control signal CNT, a down edge occurs in the signal S122.

Here, while the delay times Tdly_H1 and Tdly_L1 are variable, the delay time Tdly_fix is fixed. The delay time Tdly_fix is a fixed length of time that is determined previously at the stage of designing of the switching IC 1. The delay time Tdly_fix added by the delay adding circuit 112 and the delay time Tdly_fix added by the delay adding circuit 121 can be equal to, or slightly different from, each other. In the initial delay state immediately after the start-up of the switching IC 1, the delay times Tdly_H1 and Tdly_L1 are significantly longer than the delay time Tdly_fix. A lower limit can be set on the delay times Tdly_H1 and Tdly_L1. In that case, the delay times Tdly_H1 and Tdly_L1 can be prescribed not to become equal to or shorter than the delay time Tdly_fix.

The circuit 113 is a two-input NAND circuit. The circuit 113 outputs, as a signal S113, the NAND signal of the signals S111 and S112. Accordingly, only if the signals S111 and S112 are both at high level is the signal S113 at low level. If at least one of the signals S111 and S112 is at low level, the signal S113 is at high level.

The circuit 123 is a two-input NOR circuit. The circuit 123 outputs, as a signal S123, the NOR signal of the signals S121 and S122. Accordingly, only if the signals S121 and S122 are both at low level is the signal S123 at high level. If at least one of the signals S121 and S122 is at high level, the signal S123 is at low level.

The circuits 114 and 115 and the transistors 116 and 117 constitute a high-side pre-driver for driving the gate of the transistor MH1. This high-side pre-driver makes the transistor MH1 on by feeding its gate with a low-level gate signal GH during the low-level period of the signal S113, and makes the transistor MH1 off by feeding its gate with a high-level gate signal GH during the high-level period of the signal S113. In Practical Example EX1_A, the high-level gate signal GH has the potential of the input voltage $V_{IN}$ and the low-level gate signal GH has the ground potential. The input voltage $V_{IN}$ is higher than the gate threshold voltage of the transistor MH1.

The circuits 124 and 125 and the transistors 126 and 127 constitute a low-side pre-driver for driving the gate of the transistor ML1. This low-side pre-driver makes the transistor ML1 on by feeding its gate with a high-level gate signal GL during the high-level period of the signal S123, and makes the transistor ML1 off by feeding its gate with a low-level gate signal GL during the low-level period of the signal S123. In Practical Example EX1_A, the high-level gate signal GL has the potential of the input voltage $V_{IN}$ and the low-level gate signal GL has the ground potential. The input voltage $V_{IN}$ is higher than the gate threshold voltage of the transistor ML1.

Specifically, the circuits 114, 115, 124, and 125 are inverter circuits. The circuits 114 and 115 each receive the signal S113 and output the inversion signal of the signal S113. The output signal of the circuit 114 is fed to the gate of the transistor 116 and the output signal of the circuit 115 is fed to the gate of the transistor 117. The circuits 124 and 125 each receive the signal S123 and output the inversion signal of the signal S123. The output signal of the circuit 124 is fed to the gate of the transistor 126 and the output signal of the circuit 125 is fed to the gate of the transistor 127. The sources of the transistors 116 and 126 are connected to the power input terminal $T_{VIN}$ to receive the input voltage $V_{IN}$. The sources of the transistors 117 and 127 are connected to the ground terminal $T_{GND}$. The drains of the transistors 116 and 117 are connected together, and are connected across a gate wring 118 to the gate of the transistor MH1. The signal that appears on the gate wring 118 is the gate signal GH. The drains of the transistors 126 and 127 are connected together, and are connected across a gate wring 128 to the gate of the transistor ML1. The signal that appears on the gate wring 128 is the gate signal GL.

The circuits 131 and 132 are Schmitt-trigger inverter circuits (in other words, inverter circuits with hysteresis). In the switching control circuit 100, the circuits 131 and 132 correspond to the circuits 11H and 11L, respectively, shown in in FIG. 1, and the output signals of the circuits 131 and 132 correspond to the signals Hon and Loff respectively. Accordingly, in the switching control circuit 100, the up edge timings of the output signals of the circuits 131 and 132 correspond to the edge timings tHon and tLoff respectively (see FIG. 3).

The input terminal of the circuit 131 is connected to the gate wring 118 to receive the gate signal GH. The circuit 131 outputs a signal Hon corresponding to the gate signal GH. Here, the voltage (potential) of the gate signal GH is called the gate voltage and is identified by the symbol "$V_{GH}$". Starting with a state where the signal Hon is at low level, when the gate voltage $V_{GH}$ falls below a predetermined positive threshold voltage $V_{TH131}$, an up edge occurs in the signal Hon; after that, when the gate voltage $V_{GH}$ rises above the voltage ($V_{TH131}+\Delta V_{HYS}$), a down edge occurs in the signal Hon. Here, the inequality $0<V_{TH131}<V_{TH131}+\Delta V_{HYS}<V_{IN}$ holds. $\Delta V_{HYS}$ represents a positive hysteresis voltage. The threshold voltage $V_{TH131}$ can be determined such that the voltage ($V_{IN}-V_{TH131}$) is equal to or substantially equal to the gate threshold voltage of the transistor MH1.

The input terminal of the circuit 132 is connected to the gate wring 128 to receive the gate signal GL. The circuit 132 outputs a signal Loff corresponding to the gate signal GL. Here, the voltage (potential) of the gate signal GL is called the gate voltage and is identified by the symbol "$V_{GL}$". Starting with a state where the signal Loff is at low level, when the gate voltage $V_{GL}$ falls below a predetermined positive threshold voltage $V_{TH132}$, an up edge occurs in the signal Loff; after that, when the gate voltage $V_{GL}$ rises above the voltage ($V_{TH132}+\Delta V_{HYS}$), a down edge occurs in the signal Loff. Here, the inequality $0<V_{TH132}<V_{TH132}+\Delta V_{HYS}<V_{IN}$ holds. The threshold voltage $V_{TH132}$ can be determined such that the threshold voltage $V_{TH132}$ is equal to or substantially equal to the gate threshold voltage of the transistor ML1.

The circuits 133 and 134 are Schmitt-trigger inverter circuits (in other words, inverter circuits with hysteresis). In the switching control circuit 100, the circuits 133 and 134 correspond to the circuits 12H and 12L, respectively, in in FIG. 1, and the output signals of the circuits 133 and 134 correspond to the signals Hoff and Lon respectively. Accordingly, in the switching control circuit 100, the up edge timings of the output signals of the circuits 133 and 134 correspond to the edge timings tHoff and tLon respectively (see FIG. 3).

The input terminal of the circuit 133 is connected to the gate wring 118 to receive the gate signal GH. The circuit 133 outputs a signal Hoff corresponding to the gate signal GH. Starting with a state where the signal Hoff is at low level, when the gate voltage $V_{GH}$ rises above a predetermined positive threshold voltage $V_{TH133}$, an up edge occurs in the signal Hoff; after that, when the gate voltage $V_{GH}$ falls below the voltage ($V_{TH133}-\Delta V_{HYS}$), a down edge occurs in the signal Hoff. Here, the inequality $0<V_{TH133}-\Delta V_{HYS}<V_{TH133}<V_{IN}$ holds. The threshold voltage $V_{TH133}$ can be determined such that the voltage ($V_{IN}-V_{TH133}$) is equal to or substantially equal to the gate threshold voltage of the transistor MH1.

The input terminal of the circuit 134 is connected to the gate wring 128 to receive the gate signal GL. The circuit 134 outputs a signal Lon corresponding to the gate signal GL. Starting with a state where the signal Lon is at low level, when the gate voltage $V_{GL}$ rises above a predetermined positive threshold voltage $V_{TH134}$, an up edge occurs in the signal Lon; after that, when the gate voltage $V_{GL}$ falls below the voltage ($V_{TH134}-\Delta V_{HYS}$), a down edge occurs in the signal Lon. Here, the inequality $0<V_{TH134}-\Delta V_{HYS}<V_{TH134}<V_{IN}$ holds. The threshold voltage $V_{TH134}$ can be determined such that the threshold voltage $V_{TH134}$ is equal to or substantially equal to the gate threshold voltage of the transistor ML1.

Based on the signals Hon and Loff from the circuits 131 and 132, the delay setting circuit 110 generates a signal S110 that specifies and controls the delay time Tdly_H1 in the delay adding circuit 111, and feeds the generated signal S110 to the delay adding circuit 111. The delay adding circuit 111 adds the delay time Tdly_H1 corresponding to the signal S110 to the drive control signal CNT. In Practical Example EX1_A, the circuits 110 to 112, or the circuits 110 to 113, constitute the adjustment circuit 21 in FIG. 1.

Based on the signals Hoff and Lon from the circuits 133 and 134, the delay setting circuit 120 generates a signal S120 that specifies and controls the delay time Tdly_L1 in the delay adding circuit 122, and feeds the generated signal S120 to the delay adding circuit 122. The delay adding circuit 122 adds the delay time Tdly_L1 corresponding to the signal S120 to the drive control signal CNT. In Practical Example EX1_A, the circuits 120 to 122, or the circuits 120 to 123, constitute the adjustment circuit 22 in FIG. 1.

Each time an up edge occurs in the drive control signal CNT, one up edge occurs in each of the signals Hon and Loff. The delay setting circuit 110 senses the relationship between the up edge timings tHon and tLoff of the signals Hon and Loff based on the up edge in the drive control signal CNT (see FIG. 3) and generates and outputs the signal S110 corresponding to the sensing result. What the delay setting circuit 110 senses includes the difference between the edge timings tHon and tLoff as well as the temporal order of the edge timings tHon and tLoff. The delay time Tdly_H1 in the delay adding circuit 111 depends on the signal S110. Here, the circuits 110 and 111 can change the delay time Tdly_H1 in such a way as to carry out the first dead time reduction operation mentioned above. The difference between the edge timings tHon and tLoff can be understood to be the difference between the phases of the up edges in the signals Hon and Loff.

Each time a down edge occurs in the drive control signal CNT, one up edge occurs in each of the signals Hoff and Lon. The delay setting circuit 120 senses the relationship between the up edge timings tHoff and tLon of the signals Hoff and Lon based on the down edge in the drive control signal CNT (see FIG. 3) and generates and outputs the signal S120 corresponding to the sensing result. What the delay setting circuit 120 senses includes the difference between the edge timings tHoff and tLon as well as the temporal order of the edge timings tHoff and tLon. The delay time Tdly_L1 in the delay adding circuit 122 depends on the signal S120. Here, the circuits 120 and 122 can change the delay time Tdly_L1 in such a way as to carry out the second dead time reduction operation mentioned above. The difference between the edge timings tHoff and tLon can be understood to be the difference between the phases of the up edges in the signals Hoff and Lon.

Figure 6:
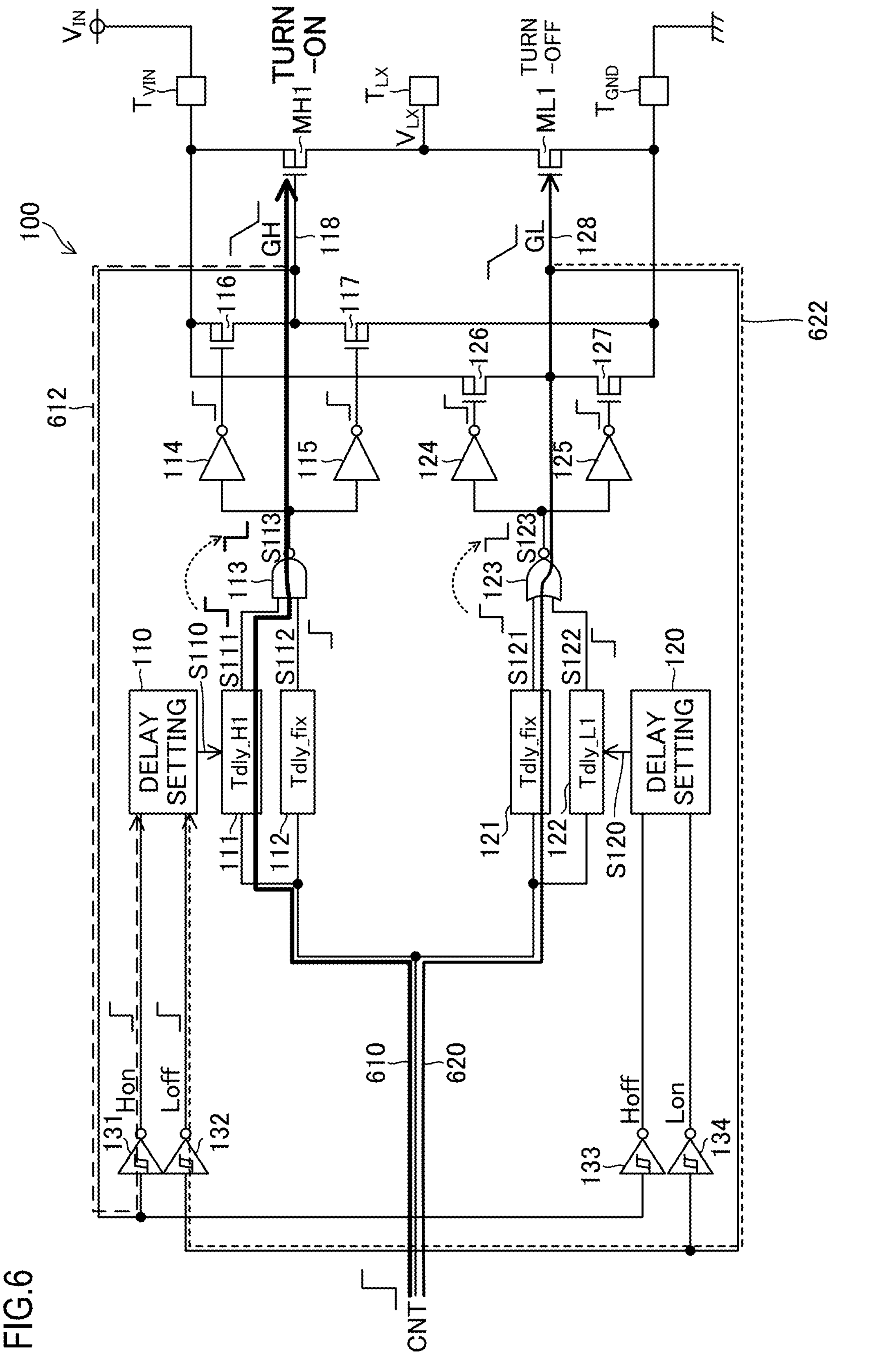
FIG. 6 is a diagram illustrating operation related to an up edge (rising edge) in a drive control signal according to Practical Example EX1_A of the present disclosure.
Figure 7:
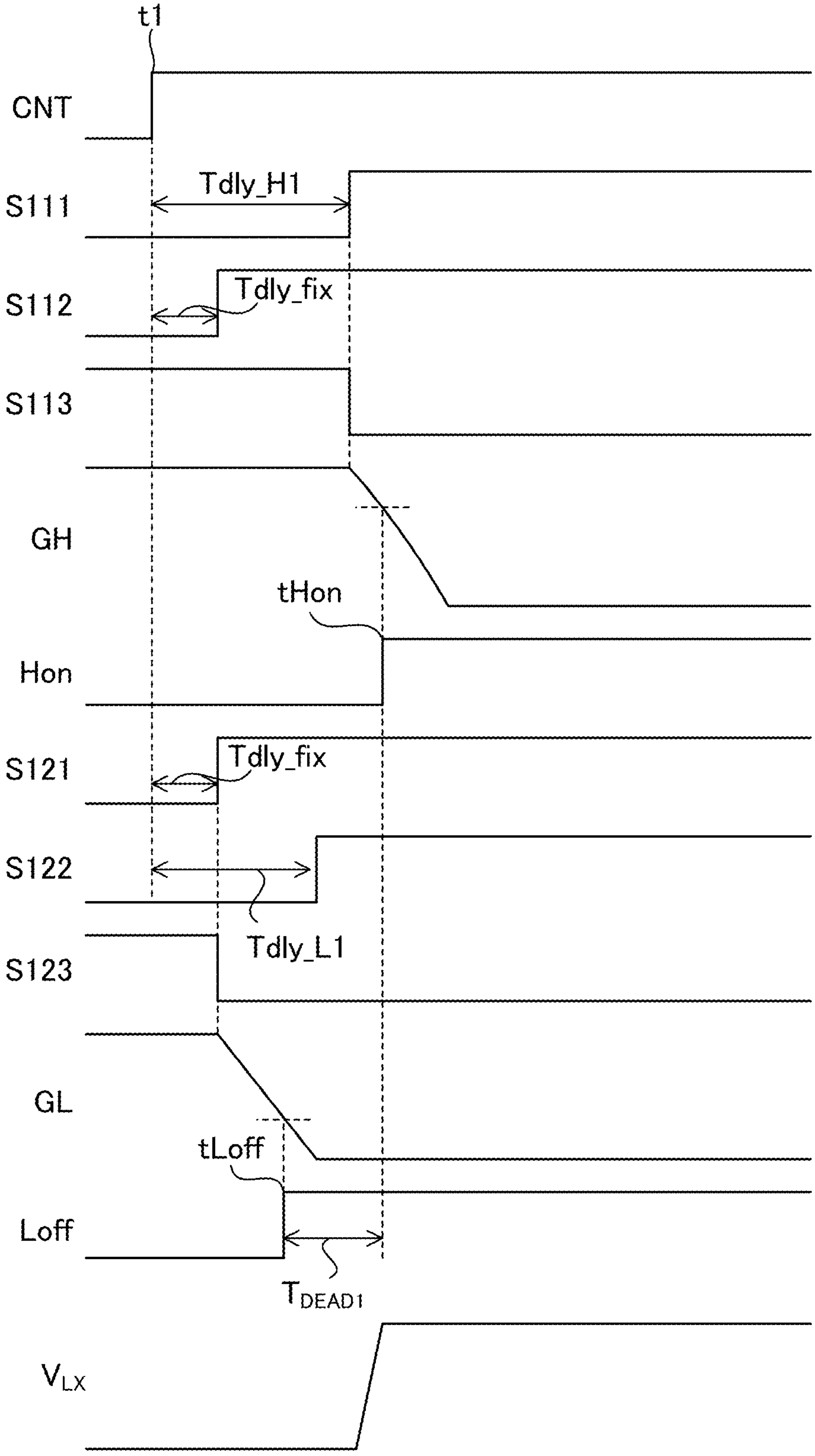
FIG. 7 is a timing chart related to an up edge (rising edge) in a drive control signal according to Practical Example EX1_A of the present disclosure.

With reference to FIGS. 6 and 7, the operation of the switching control circuit 100 in response to an up edge in the drive control signal CNT will be described. In FIG. 6, an arrowed solid line 610 indicates the transmission path of a signal that causes a potential fall in the gate signal GH in response to an up edge in the drive control signal CNT. In FIG. 6, an arrowed broken line 612 indicates how a signal corresponding to a turn-on of the transistor MH1 is transmitted to the delay setting circuit 110. In FIG. 6, an arrowed solid line 620 indicates the transmission path of a signal that causes a potential fall in the gate signal GL in response to an up edge in the drive control signal CNT. In FIG. 6, an arrowed broken line 622 indicates how a signal corresponding to a turn-off of the transistor ML1 is transmitted to the delay setting circuit 110.

FIG. 7 is a timing chart of the switching control circuit 100 in response to an up edge in the drive control signal CNT. In the initial delay state immediately after the start-up of the switching IC 1, a predetermined sufficiently long initial time is set as the delay time Tdly_H1 so as to ensure that the delay time Td_Hon is longer than the delay time Td_Loff (i.e., to ensure that $T_{DEAD1}>0$; see FIG. 3). FIG. 7 is a timing chart as observed in the initial delay state or as observed when the first dead time $T_{DEAD1}$ is sufficiently long.

Referring to FIG. 7, at time point t1, an up edge occurs in the drive control signal CNT (see also FIG. 3). Then, at the lapse of the delay time Tdly_H1 from time point t1, an up edge occurs in the signal S111 and, at the lapse of the delay time Tdly_fix from time point t1, an up edge occurs in the signal S112. Since Tdly_H1>Tdly_fix, in synchronization with the up edge in the signal S111, a down edge occurs in the signal S113. In response to the down edge in the signal S113, the high-side pre-driver (114 to 117) mentioned above lowers the potential of the gate signal GH from high level (the level of the input voltage $V_{IN}$) toward low level (the level of the ground). In the course of the potential fall in the gate signal GH, at timing tHon, an up edge occurs in the signal Hon.

On the other hand, at the lapse of the delay time Tdly_fix from time point t1, an up edge occurs in the signal S121 and, at the lapse of the delay time Tdly_L1 from time point t1, an up edge occurs in the signal S122. Since Tdly_L1>Tdly_fix, in synchronization with the up edge in the signal S121, a down edge occurs in the signal S123. In response to the down edge in the signal S123, the low-side pre-driver (124 to 127) mentioned above lowers the potential of the gate signal GL from high level (the level of the input voltage $V_{IN}$) toward low level (the level of the ground). In the course of the potential fall in the gate signal GL, at timing tLoff, an up edge occurs in the signal Loff.

In a situation where the edge timing tLoff is earlier than the edge timing tHon (i.e., in a situation where the phase of an the up edge in the signal Loff leads ahead of the phase of the up edge in the signal Hon), when a signal S110 corresponding to the difference between the edge timings tLoff and tHon is fed to the delay adding circuit 111, the delay adding circuit 111 decreases the delay time Tdly_H1. The amount of decrease here can increase as the difference between the edge timings tLoff and tHon increases (i.e., as the first dead time $T_{DEAD1}$ increases), or can be constant.

As, starting with the initial delay state, the drive control signal CNT is switched between high and low levels repeatedly, according to the difference between the edge timings tLoff and tHon, the delay time Tdly_H1 keeps decreasing until it stabilizes in a state where the difference between the edge timings tLoff and tHon is zero or insignificantly small.

With attention paid to the up edge in the drive control signal CNT, the delay adding circuit 111 is an example of a variable delay circuit that outputs an active signal at the lapse of a variable delay time Tdly_H1 from the up edge in the drive control signal CNT. The active signal here corresponds to the high-level signal S111. Based on the active signal (when triggered by the output of the active signal), the switching control circuit 100 turns off the transistor MH1 by feeding it with the gate signal GH that lower the gate potential of the transistor MH1. Then, starting with the state where Td_Hon>Td_Loff (see FIGS. 3 and 7), the adjustment circuit (21) including the delay setting circuit 110 and the delay adding circuit 111 decreases the delay time Tdly_H1 based on the difference between the edge timings tHon and tLoff so as to decrease the delay time Td_Hon, and can thereby decrease the first dead time $T_{DEAD1}$.

The delay time Tdly_H1, which corresponds to an added delay time, is part of the total delay time (i.e., the delay time Td_Hon) at the turn-on of the transistor MH1. Accordingly, as the delay time Tdly_H1 increases and decreases, the delay time Td_Hon too increases and decreases. On the other hand, the delay time Tdly_fix added by the delay adding circuit 121 is part of the delay time Td_Loff. Note that, if, for the sake of discussion, the delay time Tdly_H1 becomes so short that the edge timing tHon is earlier than the up edge timing tLoff, based on the signals Hon and Loff, the delay setting circuit 110 and the delay adding circuit 111 correct the delay time Tdly_H1 by increasing it.

Figure 8:
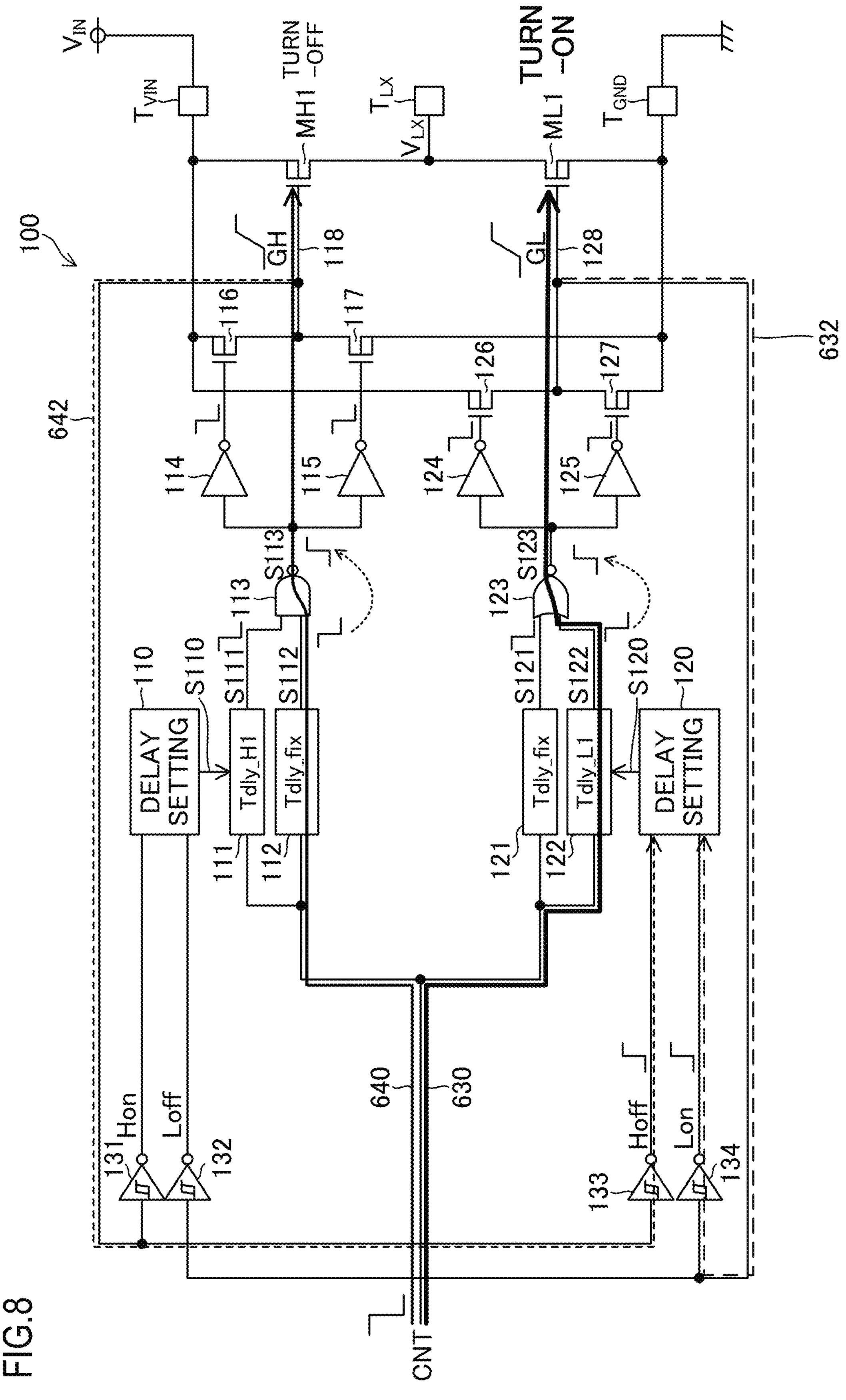
FIG. 8 is a diagram illustrating operation related to a down edge (falling edge) in a drive control signal according to Practical Example EX1_A of the present disclosure.
Figure 9:
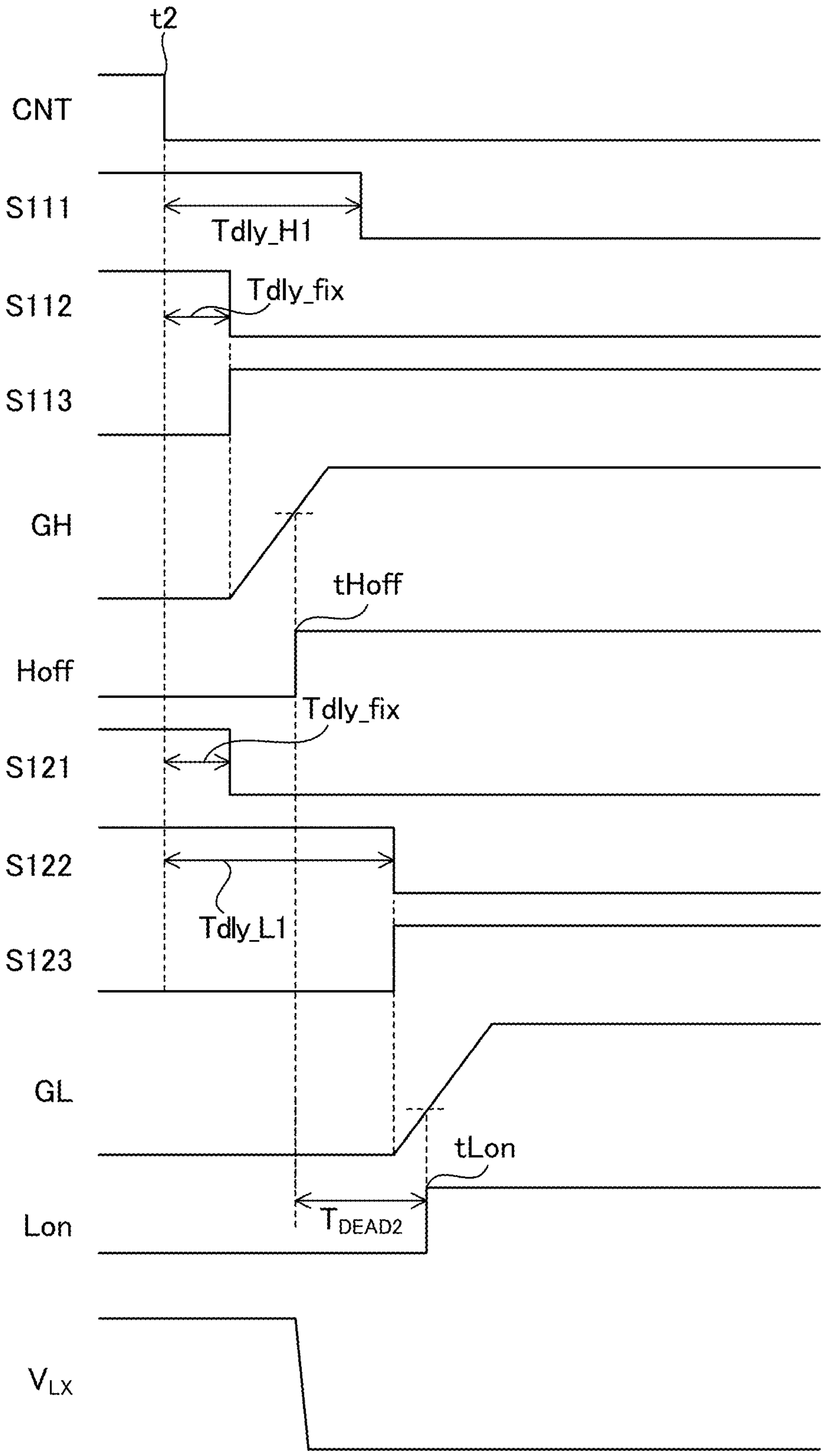
FIG. 9 is a timing chart related to a down edge (falling edge) in a drive control signal according to Practical Example EX1_A of the present disclosure.

With reference to FIGS. 8 and 9, the operation of the switching control circuit 100 in response to a down edge in the drive control signal CNT will be described. In FIG. 8, an arrowed solid line 630 indicates the transmission path of a signal that causes a potential rise in the gate signal GL in response to a down edge in the drive control signal CNT. In FIG. 8, an arrowed broken line 632 indicates how a signal corresponding to a turn-on of the transistor ML1 is transmitted to the delay setting circuit 120. In FIG. 8, an arrowed solid line 640 indicates the transmission path of a signal that causes a potential rise in the gate signal GH in response to a down edge in the drive control signal CNT. In FIG. 8, an arrowed broken line 642 indicates how a signal corresponding to a turn-off of the transistor MH1 is transmitted to the delay setting circuit 120.

FIG. 9 is a timing chart of the switching control circuit 100 in response to a down edge in the drive control signal CNT. In the initial delay state immediately after the start-up of the switching IC 1, a predetermined sufficiently long initial time is set as the delay time Tdly_L1 so as to ensure that the delay time Td_Lon is longer than the delay time Td_Hoff (i.e., to ensure that $T_{DEAD2}>0$; see FIG. 3). FIG. 9 is a timing chart as observed in the initial delay state or as observed when the second dead time $T_{DEAD2}$ is sufficiently long.

Referring to FIG. 9, at time point t2, a down edge occurs in the drive control signal CNT (see also FIG. 3). Then, at the lapse of the delay time Tdly_H1 from time point t2, a down edge occurs in the signal S111 and, at the lapse of the delay time Tdly_fix from time point t2, a down edge occurs in the signal S112. Since Tdly_H1>Tdly_fix, in synchronization with the down edge in the signal S112, an up edge occurs in the signal S113. In response to the up edge in the signal S113, the high-side pre-driver (114 to 117) mentioned above raises the potential of the gate signal GH from low level (the level of the ground) toward high level (the level of the input voltage $V_{IN}$). In the course of the potential rise in the gate signal GH, at timing tHoff, an up edge occurs in the signal Hoff.

On the other hand, at the lapse of the delay time Tdly_fix from time point t2, a down edge occurs in the signal S121 and, at the lapse of the delay time Tdly_L1 from time point t2, a down edge occurs in the signal S122. Since Tdly_L1>Tdly_fix, in synchronization with the down edge in the signal S122, an up edge occurs in the signal S123. In response to the up edge in the signal S123, the low-side pre-driver (124 to 127) mentioned above raises the potential of the gate signal GL from low level (the level of the ground) toward high level (the level of the input voltage $V_{IN}$). In the course of the potential rise in the gate signal GL, at timing tLon, an up edge occurs in the signal Lon.

In a situation where the edge timing tHoff is earlier than the edge timing tLon (i.e., in a situation where the phase of the up edge in the signal Hoff leads ahead of the phase of the up edge in the signal Lon), when a signal S120 corresponding to the difference between the edge timings tHoff and tLon is fed to the delay adding circuit 122, the delay adding circuit 122 decreases the delay time Tdly_L1. The amount of decrease here can increase as the difference between the edge timings tHoff and tLon increases (i.e., as the second dead time $T_{DEAD2}$ increases), or can be constant.

As, starting with the initial delay state, the drive control signal CNT is switched between high and low levels repeatedly, according to the difference between the edge timings tHoff and tLon, the delay time Tdly_L1 keeps decreasing until it stabilizes in a state where the difference between the edge timings tHoff and tLon is zero or insignificantly small.

With attention paid to the down edge in the drive control signal CNT, the delay adding circuit 122 is an example of a variable delay circuit that outputs an active signal at the lapse of a variable delay time Tdly_L1 from the down edge in the drive control signal CNT. The active signal here corresponds to the low-level signal S122. Based on the active signal (when triggered by the output of the active signal), the switching control circuit 100 turns on the transistor ML1 by feeding it with the gate signal GL that raises the gate potential of the transistor ML1. Then, starting with the state where Td_Lon>Td_Hoff (see FIGS. 3 and 9), the adjustment circuit (22) including the delay setting circuit 120 and the delay adding circuit 122 decreases the delay time Tdly_L1 based on the difference between the edge timings tHoff and tLon so as to decrease the delay time Td_Lon, and can thereby decrease the second dead time $T_{DEAD2}$.

The delay time Tdly_L1, which corresponds to an added delay time, is part of the total delay time (i.e., the delay time Td_Lon) at the turn-on of the transistor ML1. Accordingly, as the delay time Tdly_L1 increases and decreases, the delay time Td_Lon too increases and decreases. On the other hand, the delay time Tdly_fix added by the delay adding circuit 112 is part of the delay time Td_Hoff. Note that, if, for the sake of discussion, the delay time Tdly_L1 becomes so short that the edge timing tLon is earlier than the edge timing tHoff, based on the signals Lon and Hoff, the delay setting circuit 120 and the delay adding circuit 122 correct the delay time Tdly_L1 by increasing it.

Figure 10:
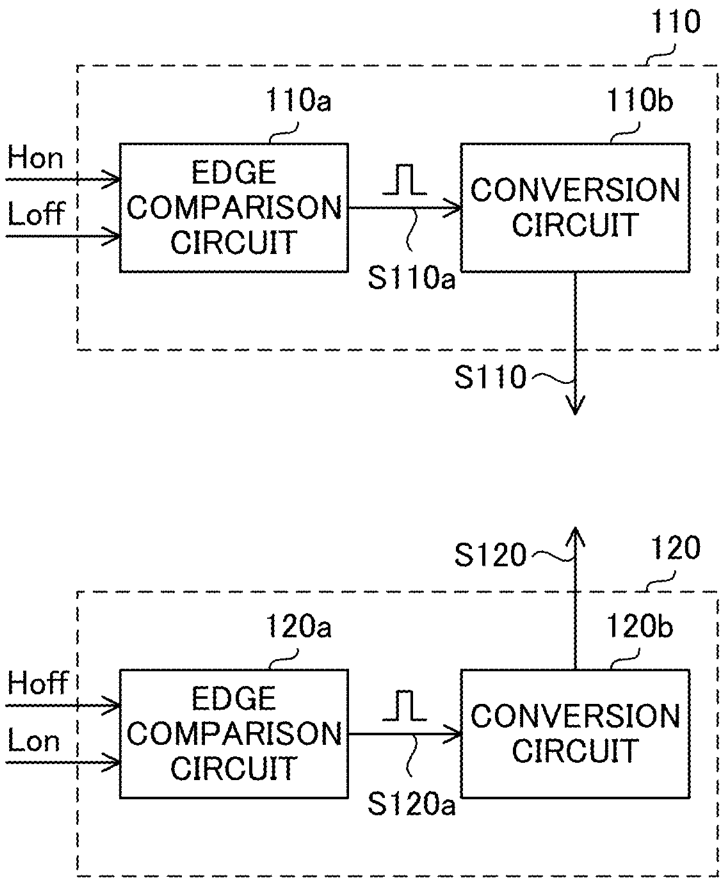
FIG. 10 is a diagram showing an internal configuration of each delay setting circuit according to Practical Example EX1_A of the present disclosure.

FIG. 10 shows a configuration example of the delay setting circuits 110 and 120. In the configuration example in FIG. 10, the delay setting circuit 110 includes an edge comparison circuit 110*a* and a conversion circuit 110*b*, and the delay setting circuit 120 includes an edge comparison circuit 120*a* and a conversion circuit 120*b*.

The edge comparison circuit 110*a* senses the difference between the edge timings tLoff and tHon based on the signals Loff and Hon and outputs a signal S110*a* according to the sensing result. Each time the edge comparison circuit 110*a* senses, a pulse is produced in the signal S110*a*. The pulse width, that is, the length in time of the pulse in the signal S110*a*, depends on the temporal order of the edge timings tLoff and tHon and the difference between the edge timings tLoff and tHon. The conversion circuit 110*b* converts the pulse width of the signal S110*a* into a voltage and outputs as the signal S110 a signal with the so obtained voltage.

The edge comparison circuit 120*a* senses the difference between the edge timings tHoff and tLon based on the signals Hoff and Lon and outputs a signal S120*a* according to the sensing result. Each time the edge comparison circuit 120*a* senses, a pulse is produced in the signal S120*a*. The pulse width, that is, the length in time of the pulse in the signal S120*a*, depends on the temporal order of the edge timings tHoff and tLon and the difference between the edge timings tHoff and tLon. The conversion circuit 120*b* converts the pulse width of the signal S120*a* into a voltage and outputs as the signal S120 a signal with the so obtained voltage.

Practical Example EX1_B

Practical Example EX1_B will be described. Practical Example EX1_B is based on Practical Example EX1_A. Unless inconsistent, for any features of Practical Example EX1_B that are not specifically mentioned, the description of the corresponding features of Practical Example EX1_A applies to Practical Example EX1_B.

Figure 11:
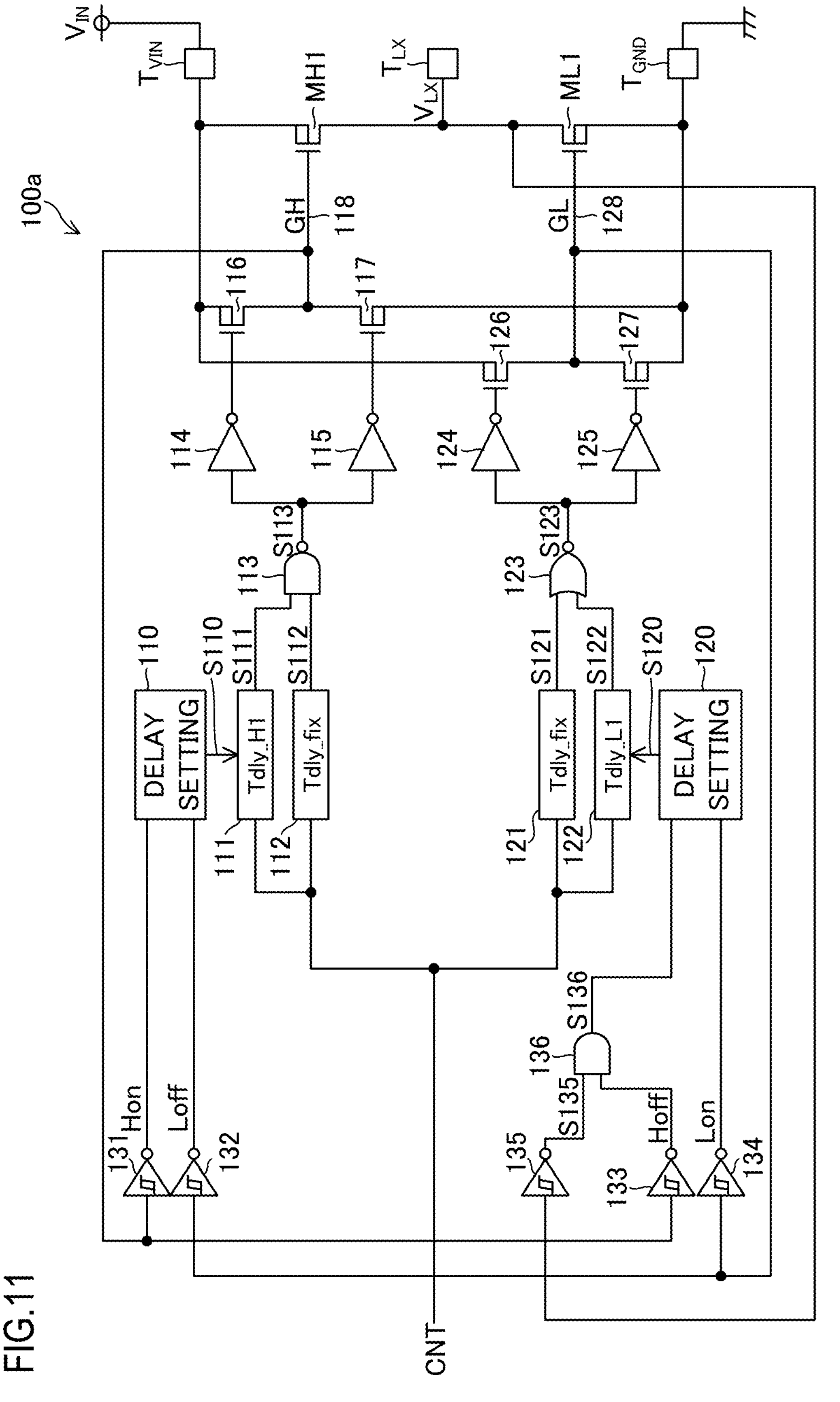
FIG. 11 is a diagram showing a configuration of a switching control circuit according to Practical Example EX1_B of the present disclosure.

FIG. 11 shows part of the internal circuit of a switching IC 1 according to Practical Example EX1_B. In the switching IC 1 of Practical Example EX1_B, the switching control circuit 10 appears as a switching control circuit 100*a* and the transistors MH and ML appear as transistors MH1 and ML1 respectively. As compared with the switching control circuit 100 (FIG. 5) of Practical Example EX1_A, the switching control circuit 100*a* has a configuration that further incudes circuits 135 and 136. Except for this addition and the features described below in connection with Practical Example EX1_B, the configuration and the operation of the switching control circuit 100*a* are the same as those of the switching control circuit 100.

The circuit 135 is a Schmitt-trigger inverter circuit (in other words, an inverter circuit with hysteresis). The input terminal of the circuit 135 is connected to the switching terminal $T_{LX}$ to receive the switching voltage $V_{LX}$. The circuit 135 outputs a signal S135 corresponding to the switching voltage $V_{LX}$. Starting with a state where the signal S135 is at low level, when the switching voltage $V_{LX}$ falls below a predetermined positive threshold voltage $V_{TH135}$, an up edge occurs in the signal S135; after that, when the switching voltage $V_{LX}$ rises above the voltage ($V_{TH135}+\Delta V_{HYS}$), a down edge occurs in the signal S135. Here, the inequality $0<V_{TH135}<V_{TH135}+\Delta V_{HYS}<V_{IN}$ holds.

The circuit 136 is a two-input AND circuit. The circuit 136 outputs, as a signal S136, the AND signal of the signal S135 from the circuit 135 and the signal Hoff from the circuit 133. Accordingly, only if the signals S135 and Hoff are both at high level is the signal S136 at high level. If at least one of the signals S135 and Hoff is at low level, the signal S136 is at low level.

In Practical Example EX1_B, the delay setting circuit 120 is fed with, instead of the combination of the signals Hoff and Lon, the signals S136 and Lon. That is, in Practical Example EX1_B, the delay setting circuit 120 generates and outputs the signal S120 not based on the signals Hoff and Lon but based on the signals S136 and Lon. In Practical Example EX1_B, the delay setting circuit 120 regards the signal S136 as the signal Hoff (i.e., it takes the up edge timing of the signal S136 as the up edge timing of the signal Hoff) and generates and outputs the signal S120 in a manner similar to that in Practical Example EX1_A, thereby specifying and controlling the delay time Tdly_L1 to be added in the delay adding circuit 122.

Assuming that the switching IC 1 according to Practical Example EX1_B is incorporated in the DC/DC converter 2 (FIG. 4), the functions of the circuits 135 and 136 will be described. A condition where the load current $I_{LD}$ is comparatively high will be referred to as a heavy-load condition and a condition where the load current $I_{LD}$ is comparatively low will be referred to as a light-load condition. In the light-load condition, the load current $I_{LD}$ can be substantially zero.

Figure 12:
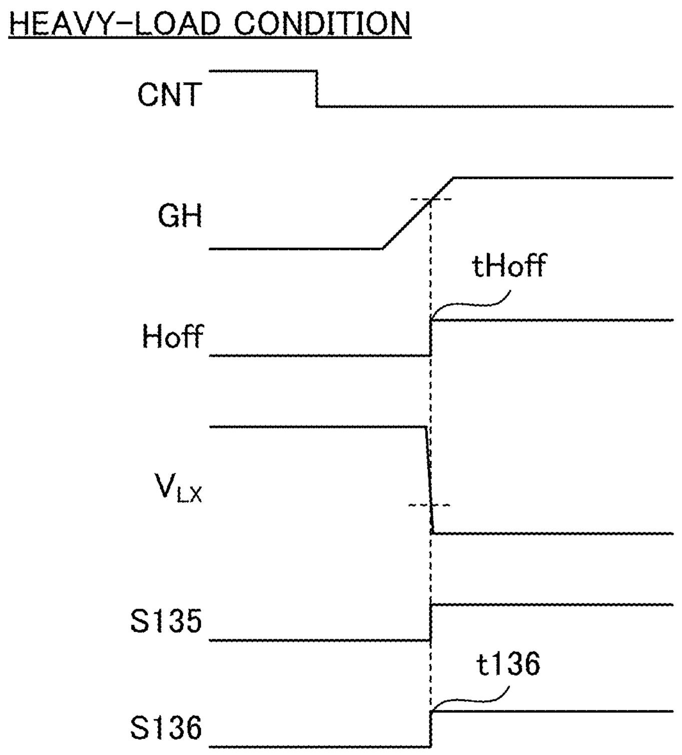
FIG. 12 is a diagram showing the waveforms of some signals and voltages in a heavy-load condition according to Practical Example EX1_B of the present disclosure.

FIG. 12 shows the waveforms of some signals or voltages in the heavy-load condition. When a down edge occurs in the drive control signal CNT, as a result of signal transmission as described in connection with Practical Example EX1_A, the potential of the gate signal GH rises from low level to high level and, at the edge timing tHoff in the course of that rise, an up edge occurs in the signal Hoff. In the heavy-load condition, as the potential of the gate signal GH rises, the channel resistance value of the transistor MH1 increases and, in the course of this increase, the comparatively high load current $I_{LD}$ and the coil $L_{OUT}$ act to cause the switching voltage $V_{LX}$ to fall sharply toward 0 V or a negative voltage. As a result, in the heavy-load condition, substantially at the same time as the up edge in the signal Hoff, an up edge occurs in the signal S135. Thus, in the heavy-load condition, the up edge timing tHoff of the signal Hoff and the up edge timing of the signal S136 substantially coincide. Accordingly, in the heavy-load condition, the operation of the switching control circuit 100*a* is substantially the same as that of the switching control circuit 100. In the following description, the up edge timing of the signal S136 is identified by the symbol "t136" and is referred to as the edge timing t136 or the timing t136.

Figure 13:
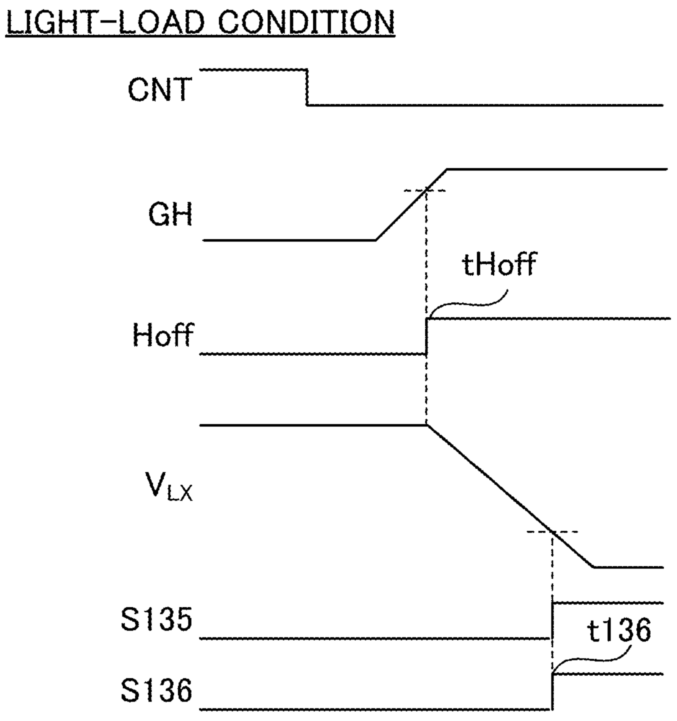
FIG. 13 is a diagram showing the waveforms of some signals and voltages in a light-load condition according to Practical Example EX1_B of the present disclosure.

FIG. 13 shows the waveforms of some signals or voltages in the light-load condition. When a down edge occurs in the drive control signal CNT, as a result of signal transmission as described in connection with Practical Example EX1_A, the potential of the gate signal GH rises from low level to high level and, at the edge timing tHoff in the course of that rise, an up edge occurs in the signal Hoff. There is no difference in what takes place thus far between the heavy- and light-load conditions. Note however that, in the light-load condition, as the potential of the gate signal GH rises, the channel resistance value of the transistor MH1 increases until the channel of the transistor MH1 is eventually cut off but, even so, since the load current $I_{LD}$ is low, the switching voltage $V_{LX}$ falls more gently than in the heavy-load condition. Then, when the switching voltage $V_{LX}$ falls sufficiently, an up edge occurs in the signal S135 and, triggered by the up edge in the signal S135, an up edge occurs also in the signal S136.

Figure 14:
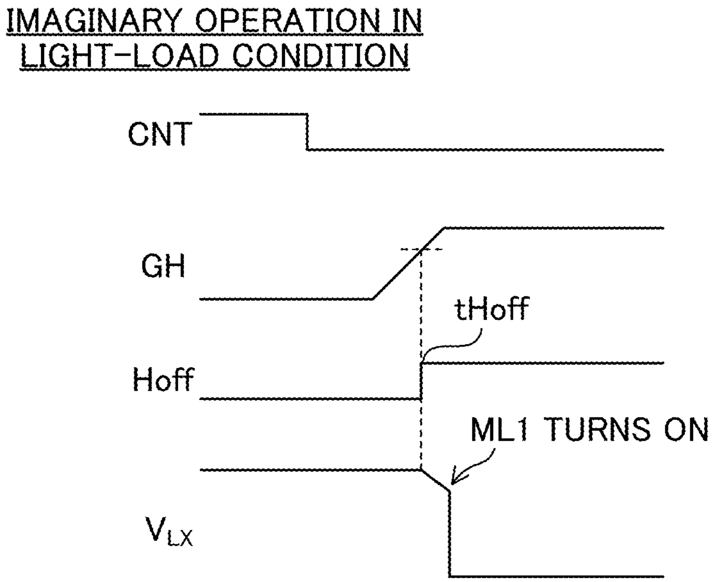
FIG. 14 is a diagram showing the waveforms of some signals and voltages as observed when imaginary operation is performed in a light-load condition according to Practical Example EX1_B of the present disclosure.

The waveforms in FIG. 13 assume that, while the switching voltage $V_{LX}$ is falling toward 0 V, the transistor ML1 is kept off. For the sake of discussion, if, while the switching voltage $V_{LX}$ is falling in the light-load condition, the transistor ML1 is turned on with the switching voltage $V_{LX}$ close to the input voltage $V_{IN}$, as shown in FIG. 14, electric charge is drawn into the ground across the channel of the transistor ML1 and the switching voltage $V_{LX}$ falls sharply to 0 V. This is as good as unnecessarily drawing electric charge into the ground (that is, wasting electric charge), and leads to a drop in efficiency.

Figure 15:
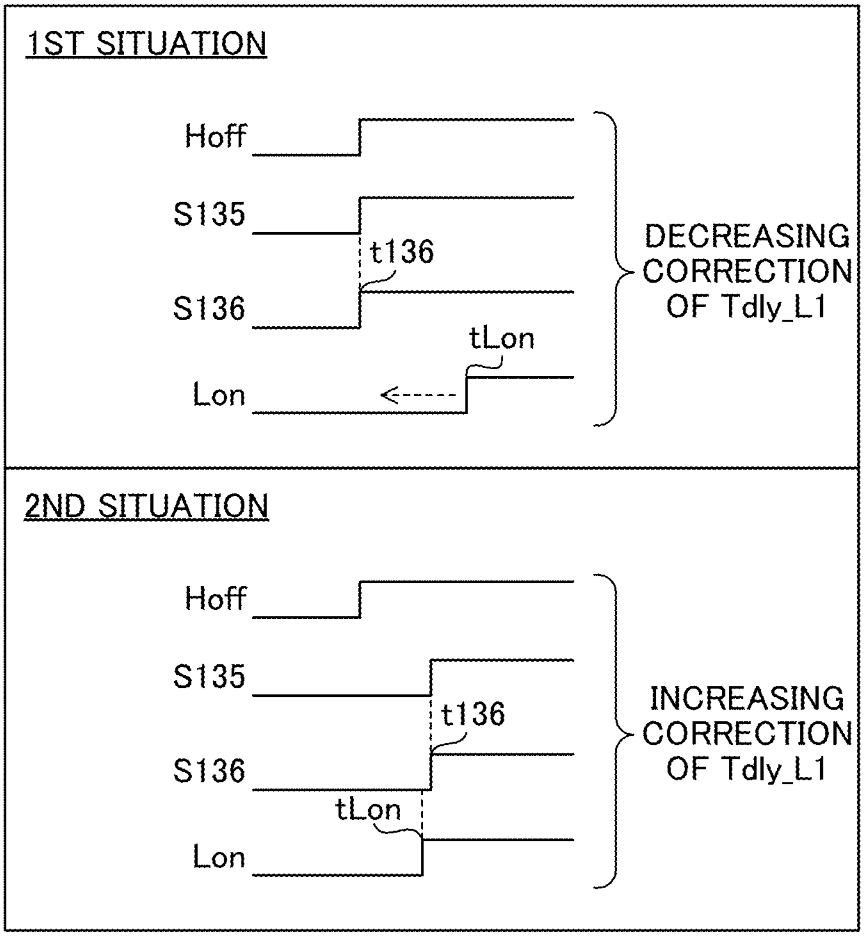
FIG. 15 is a diagram illustrating a method of adjusting an added delay time according to Practical Example EX1_B of the present disclosure.

In the switching control circuit 100*a*, the circuits 135 and 136 provided in it serve to prevent a drop in efficiency in the light-load condition, in other words, improve efficiency in the light-load condition. The improved efficiency is achieved through correction of the delay time Tdly_L1 based on the signals S136 and Lon. The delay setting circuit 120 senses the relationship between the edge timings t136 and tLon and generates and outputs the signal S120 corresponding to the sensing result. What the delay setting circuit 120 senses includes the difference between the edge timings t136 and tLon as well as the temporal order of the edge timings t136 and tLon. Now, with reference to FIG. 15, the operation of the delay setting circuit 120 and the delay adding circuit 122 in the switching control circuit 100*a* will be described.

As mentioned above, in the heavy-load condition, the edge timings tHoff and t136 substantially coincide and thus the switching control circuit 100*a* operates in a similar manner as in Practical Example EX1_A. Specifically, in a first situation where the edge timing t136 is earlier than the edge timing tLon (a situation where the phase of the up edge in the signal S136 leads ahead of the phase of the up edge in the signal Lon), the delay setting circuit 120 generates and outputs the signal S120 to decrease the delay time Tdly_L1 and, in response to this signal S120, the delay adding circuit 122 decreases the delay time Tdly_L1. The amount of decrease here can increase as the difference between the edge timings t136 and tLon increases, or can be constant.

Starting with the initial delay state, the drive control signal CNT is switched between high and low level repeatedly. If the heavy-load condition persists, according to the difference between the edge timings t136 and tLon, the delay time Tdly_L1 keeps decreasing until it stabilizes in a state where the difference between the edge timings t136 and tLon is zero or insignificantly small.

Suppose now that, afterward, a switch from the heavy-load condition to the light-load condition has taken place. The switch to the light-load condition results in the edge timing t136 occurring later than in the heavy-load condition, bringing a second situation where the edge timing t136 occurs accordingly later than the edge timing tHoff (a situation where the phase of the up edge in the signal S136 lags behind the phase of the up edge in the signal Hoff). In the second situation, the turning-off of the transistor MH1 alone does not allow the switching voltage $V_{LX}$ to fall sufficiently, and thus the signal S135 is kept at low level. Then the gate signal GL across the transmission path 630 (see FIG. 8) turns on the transistor ML1, and the fall of the switching voltage $V_{LX}$ resulting from the turning-on of the transistor ML1 produces an up edge in the signal S135 and subsequently an up edge in the signal S136. That is, in the second situation, the edge timing t136 occurs later than the edge timing tLon (the phase of the up edge in the signal S136 lags behind the phase of the up edge in the signal Lon). With the edge timing t136 occurring later than the edge timing tLon, the delay setting circuit 120 generates the signal S120 to increase the delay time Tdly_L1 and, in response to this signal S120, the delay adding circuit 122 increases the delay time Tdly_L1. The amount of increase here can be an amount corresponding to the difference between the edge timings t136 and tLon, or can be constant. As the delay time Tdly_L1 increases, the second dead time $T_{DEAD2}$ increases but this, in the light-load condition, rather increases efficiency.

If after the transition to the second situation the light-load condition persists, the delay time Tdly_L1 keeps increasing. As a result, in the light-load condition, the transistor ML1 is turned on after the switching voltage $V_{LX}$ has fallen sufficiently, and this suppresses a drop in efficiency as mentioned above. An upper limit can be set on the increase of the delay time Tdly_L1 (the delay time Tdly_L1 can be restrained from increasing above a predetermined upper-limit time). If afterward a return from the light-load condition to the heavy-load condition takes place, the delay time Tdly_L1 is decreased to cope with the heavy-load condition. That is, the delay time Tdly_L1 is adjusted optimally according to the load current $I_{LD}$.

As described above, in Practical Example EX1_B, owing to the adjustment circuit 22 (see FIG. 1) configured to include the delay setting circuit 120 and the delay adding circuit 122, the second dead time $T_{DEAD2}$ is adjusted based on the signal Hoff, the signal Lon, and the signal S135 corresponding to the switching voltage $V_{LX}$. The delay time Td_Lon (FIG. 3) occurs across the transmission path 630 in FIG. 8 and thus, through the increasing and decreasing of the delay time Tdly_L1, the delay time Td_Lon involved in the turning-on of the transistor ML1 is increased and decreased. As the delay time Td_Lon is increased and decreased, the second dead time $T_{DEAD2}$ too increases and decreases (see FIG. 3).

Practical Example EX1_C

Practical Example EX1_C will be described. Practical Example EX1_C deals with modified technologies and the like in connection with Practical Example EX1_A or EX1_B.

The configuration of the delay setting circuits 110 and 120 shown in FIG. 10 is merely illustrative. In Practical Example EX1_A or EX1_B, so long as a signal corresponding to the relationship between the edge timings tLoff and tHon (their difference and temporal order) can be generated as the signal S110, the delay setting circuit 110 can be configured as any digital or analog circuit. In Practical Example EX1_A, so long as a signal corresponding to the relationship between the edge timings tHoff and tLon (their difference and temporal order) can be generated as the signal S120, the delay setting circuit 120 can be configured as any digital or analog circuit. In Practical Example EX1_B, so long as a signal corresponding to the relationship between the edge timings t136 and tLon (their difference and temporal order) can be generated as the signal S120, the delay setting circuit 120 can be configured as any digital or analog circuit.

In Practical Example EX1_A or EX1_B, the transistor MH1 can be implemented with a P-channel IGBT and the transistor ML1 can be implemented with an N-channel IGBT. In that case, in Practical Example EX1_A or EX1_B, the source and the drain of the transistor MH1 are to be read as the emitter and the collector respectively, and the source and the drain of the transistor ML1 are to be read as the emitter and the collector respectively.

Practical Example EX2_A

Figure 16:
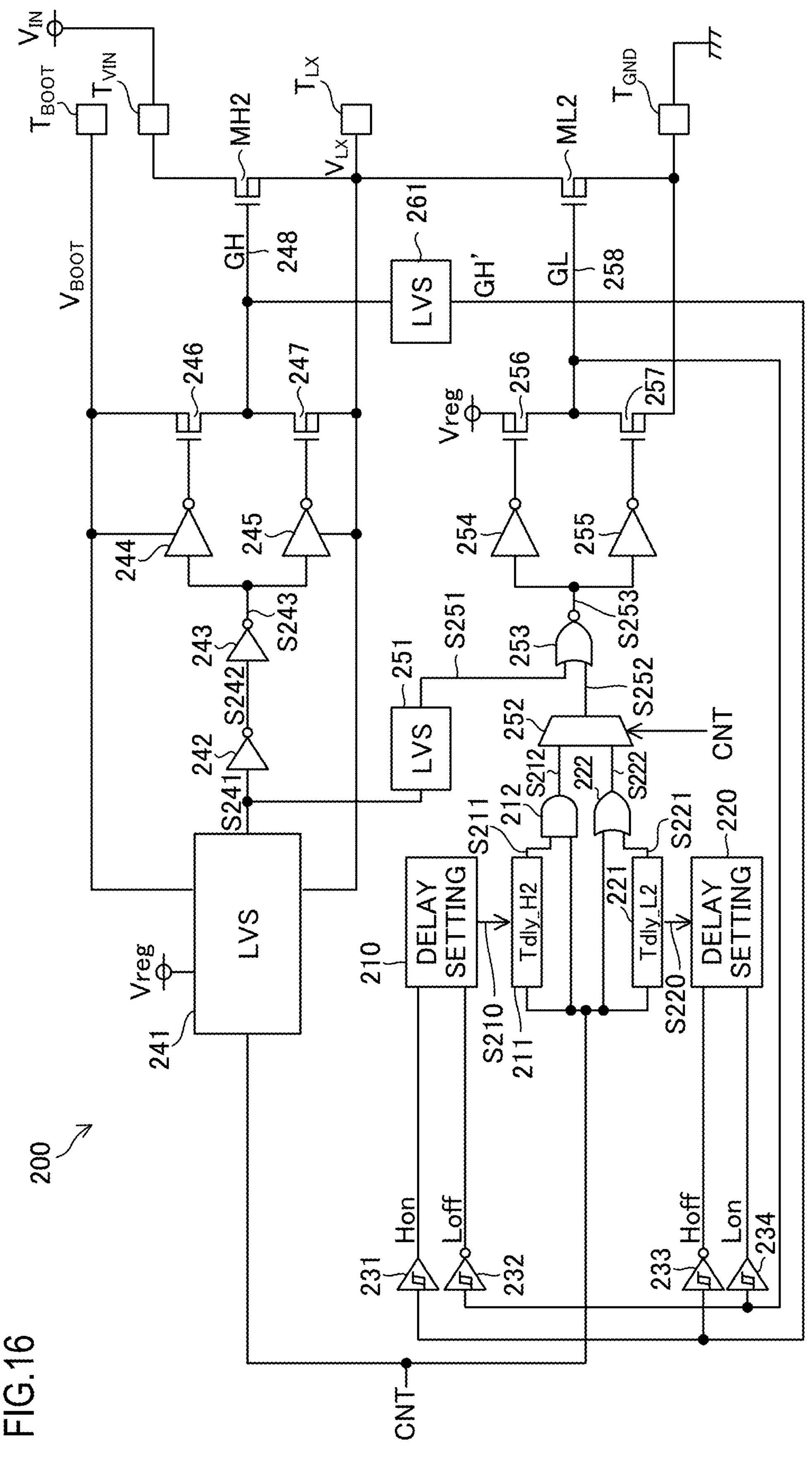
FIG. 16 is a diagram showing a configuration of a switching control circuit according to Practical Example EX2_A of the present disclosure.

Practical Example EX2_A will be described. FIG. 16 shows part of the internal circuit of a switching IC 1 according to Practical Example EX2_A. In the switching IC 1 of Practical Example EX2_A, the switching control circuit 10 (see FIG. 1) appears as a switching control circuit 200 and the transistors MH and ML appear as transistors MH2 and ML2 respectively. The transistors MH2 and ML2 are both configured as N-channel MOSFETs.

The drain of the transistor MH2 is connected to the power input terminal $T_{VIN}$ to receive the input voltage $V_{IN}$. The source of the transistor MH2 is connected to the switching terminal $T_{LX}$. The drain of the transistor ML2 is connected to the switching terminal $T_{LX}$. Thus, the source of the transistor MH2 and the drain of the transistor ML2 are connected together at the switching terminal $T_{LX}$. The source of the transistor ML2 is connected to the ground terminal $T_{GND}$ to be connected via the ground terminal $T_{GND}$ to the ground. In Practical Example EX2_A, the gate signals GH and GL refer to the gate signals that are fed to the gates of the transistors MH2 and ML2 respectively (a similar definition applies to Practical Examples EX2_B and EX2_C described later).

In Practical Example EX2_A, the switching IC 1 is provided with a boot terminal $T_{BOOT}$. The boot terminal $T_{BOOT}$ can be an external terminal of the switching IC 1. The boot terminal $T_{BOOT}$ is fed with a boot voltage $V_{BOOT}$ higher than the switching voltage $V_{LX}$. For example, in a case where the switching IC 1 is incorporated in the DC/DC converter 2 in FIG. 4, the boot voltage $V_{BOOT}$ can be generated by use of a well-known bootstrap circuit that exploits variation of the switching voltage $V_{LX}$. The boot voltage $V_{BOOT}$ can instead be generated by boosting the input voltage $V_{IN}$ with any boosting circuit (unillustrated).

The switching control circuit 200 includes circuits or elements identified by the reference signs 210 to 212, 220 to 222, 231 to 234, 241 to 247, 251 to 257, and 261.

The circuits 210 to 212, 220 to 222, 231 to 234, and 252 to 255 are digital or analog circuits that operate from an internal supply voltage Vreg relative to the ground potential. Of these circuits, the circuits 211 to 212, 221 to 222, 231 to 234, and 252 to 255 each output a binary signal that takes either high or low level. With respect to each of the input signals to and the output signals from the circuits 211 to 212, 221 to 222, 231 to 234, and 252 to 255, and also in the drive control signal CNT, low level has the ground potential and high level has the potential of the internal supply voltage Vreg. The internal supply voltage Vreg is a positive direct-current voltage generated based on the input voltage $V_{IN}$ by an internal power supply circuit (unillustrated) provided within the switching IC 1. Instead, the input voltage $V_{IN}$ itself can be used as the internal supply voltage Vreg.

The circuits 242 to 245 are digital circuits that operate from the boot voltage $V_{BOOT}$ relative to the potential of the switching terminal $T_{LX}$. The circuits 242 to 245 each output a binary signal that takes either high or low level. With respect to each of the input signals to and the output signals from the circuits 242 to 245, low level has the potential at the switching terminal $T_{LX}$ (i.e., the potential of the switching voltage $V_{LX}$) and high level has the potential of the boot voltage $V_{BOOT}$. The transistors 246 and 256 are P-channel MOSFETs and the transistors 247 and 257 are N-channel MOSFETs.

The circuits 211 and 221 are delay adding circuits. The delay adding circuits 211 and 221 are each fed with the drive control signal CNT. The delay adding circuits 211 and 221 add to the drive control signal CNT delays with delay times Tdly_H2 and Tdly_L2 respectively and output the so delayed signals. The delay times Tdly_H2 and Tdly_L2 are delay times that are added purposefully and thus can be called added delay times or inserted delay times.

The delay adding circuit 211 outputs as a signal S211 a signal resulting from delaying the drive control signal CNT by the delay time Tdly_H2. Accordingly, at a timing later by the delay time Tdly_H2 than the up edge timing of the drive control signal CNT, an up edge occurs in the signal S211. Likewise, at a timing later by the delay time Tdly_H2 than the down edge timing of the drive control signal CNT, a down edge occurs in the signal S211.

The delay adding circuit 221 outputs as a signal S221 a signal resulting from delaying the drive control signal CNT by the delay time Tdly_L2. Accordingly, at a timing later by the delay time Tdly_L2 than the up edge timing of the drive control signal CNT, an up edge occurs in the signal S221. Likewise, at a timing later by the delay time Tdly_L2 than the down edge timing of the drive control signal CNT, a down edge occurs in the signal S221.

Here, the delay times Tdly_H2 and Tdly_L2 are variable. An upper limit can however be set on the delay time Tdly_H2. For example, an upper limit can be set on the delay time Tdly_H2 such that the delay time Tdly_H2 does not become equal to or longer than a transmission delay time Tdly_LVS1, described later, or equal to or longer than the time (Tdly_LVS1−ΔT) (see FIG. 18). The time (Tdly_LVS1−ΔT) is a length of time shorter than the transmission delay time Tdly_LVS1 by a predetermined time ΔT. A lower limit can be set on the delay time Tdly_H2. For example, a lower limit can be set on the delay time Tdly_H2 such that the delay time Tdly_L2 does not become equal to or shorter than a transmission delay time Tdly_LVS2, described later, or equal to or shorter than the time (Tdly_LVS2+ΔT) (see FIG. 20). The time (Tdly_LVS2+ΔT) is a length of time longer than the transmission delay time Tdly_LVS2 by a predetermined time ΔT.

The circuit 212 is a two-input AND circuit. The circuit 212 outputs, as a signal S212, the AND signal of the signals S211 and CNT. Accordingly, only if the signals S211 and CNT are both at high level is the signal S212 at high level. If at least one of the signals S211 and CNT is at low level, the signal S212 is at low level.

The circuit 222 is a two-input OR circuit. The circuit 222 outputs, as a signal S222, the OR signal of the signals S221 and CNT. Accordingly, only if the signals S221 and CNT are both at low level is the signal S222 at low level. If at least one of the signals S221 and CNT is at high level, the signal S222 is at high level.

The circuit 252 is a selector. The selector 252 selects one of the signals S212 and S222 according to the drive control signal CNT, and outputs the selected signal as a signal S252. If the drive control signal CNT is at high level, the selector 252 selects and outputs the signal S212 as the signal S252 and, if the drive control signal CNT is at low level, the selector 252 selects and outputs the signal S222 as the signal S252.

The circuits 241, 251, and 261 are level shifters. The level shifters (241, 251, 261) are fed with the internal supply voltage Vreg, the boot voltage $V_{BOOT}$, and the switching voltage $V_{LX}$ and are connected to the ground; they shift the levels of the input signals to them toward a high- or low-potential side and output the so level-shifted signals. These level shifters are of a well-known configuration and therefore their internal configuration will be omitted from description. The level shifters (241, 251, 261) are configured using high-withstand-voltage elements that withstand application of the boot voltage $V_{BOOT}$. Due to the level shifters (241, 251, 261) using high-withstand-voltage elements in performing level shifting, comparatively large signal transmission delays occur in the level shifters.

The level shifter 241 shifts the level of the drive control signal CNT, which is a signal relative to the ground potential, to obtain a signal relative to the switching voltage $V_{LX}$, and thereby generates and outputs a signal S241 that is at either low or high level based on the drive control signal CNT. That is, the signal S241 is a level-shifted drive control signal CNT (a shifted drive control signal). With respect to the signal S241, low level has the potential at the switching terminal $T_{LX}$ (i.e., the potential of the switching voltage $V_{LX}$) and high level has the potential of the boot voltage $V_{BOOT}$. In response to an up edge in the drive control signal CNT, an up edge occurs also in the signal S241, which thus turns to high level; in response to a down edge in the drive control signal CNT, a down edge occurs also in the signal S241, which thus turns to low level.

Here, due to the signal transmission delay occurring in the level shifter 241, at a timing later by the transmission delay time Tdly_LVS1 than the up edge timing of the drive control signal CNT, an up edge occurs in the signal S241 (see FIG. 18) and, at a timing later by the transmission delay time Tdly_LVS2 than the down edge timing of the drive control signal CNT, a down edge occurs in the signal S241 (see FIG. 20). The transmission delay times Tdly_LVS1 and Tdly_LVS2 are predetermined lengths of time that depend on the characteristics of the level shifter 241 and the like. The transmission delay times Tdly_LVS1 and Tdly_LVS2 can however be understood to be transmission delay times across the circuits 241 to 243 as a whole.

The circuits 242 and 243 are inverter circuits. The circuit 242 receives the signal S241 and outputs the inversion signal S242 of the signal S241; the circuit 243 receives the signal S242 and outputs the inversion signal S243 of the signal S242. Thus, if the signal S241 is at high level, the inversion signal S243 too is at high level and, if the signal S241 is at low level, the inversion signal S243 too is at low level.

The circuits 244 and 245 and the transistors 246 and 247 constitute a high-side pre-driver for driving the gate of the transistor MH2. This high-side pre-driver makes the transistor MH2 on by feeding its gate with a high-level gate signal GH during the high-level period of the signal S243, and makes the transistor MH2 off by feeding its gate with a low-level gate signal GH during the low-level period of the signal S243. In Practical Example EX2_A, the high-level gate signal GH has the potential of the boot voltage $V_{BOOT}$ and the low-level gate signal GH has the potential of the switching voltage $V_{LX}$. The potential difference between the voltages $V_{BOOT}$ and $V_{LX}$ is larger than the gate threshold voltage of the transistor MH2.

Specifically, the circuits 244 and 245 are inverter circuits. The circuits 244 and 245 each receive the signal S243 and output the inversion signal of the signal S243. The output signal of the circuit 244 is fed to the gate of the transistor 246 and the output signal of the circuit 245 is fed to the gate of the transistor 247. The source of the transistor 246 is connected to the boot terminal $T_{BOOT}$ to receive the boot voltage $V_{BOOT}$. The source of the transistor 247 is connected to the switching terminal $T_{LX}$. The drains of the transistors 246 and 247 are connected together, and are connected across a gate wring 248 to the gate of the transistor MH2. The signal that appears on the gate wring 248 is the gate signal GH.

The level shifter 251 shifts the level of the signal S241, which is a signal relative to the switching voltage $V_{LX}$, to obtain a signal relative to the ground potential, and thereby generates and outputs a signal S251 that is at either low or high level based on the signal S241. With respect to the signal S251, low level has the ground potential and high level has the potential of the internal supply voltage Vreg. In response to an up edge in the signal S241, an up edge occurs also in the signal S251, which thus turns to high level; in response to a down edge in the signal S241, a down edge occurs also in the signal S251, which thus turns to low level. A signal transmission delay is inherent also in the level shifter 251.

The circuit 253 is a two-input NOR circuit. The circuit 253 outputs, as a signal S253, the NOR signal of the signals S251 and S252. Accordingly, only if the signals S251 and S252 are both at low level is the signal S253 at high level. If at least one of the signals S251 and S252 is at high level, the signal S253 is at low level.

The circuits 254 and 255 and the transistors 256 and 257 constitute a low-side pre-driver for driving the gate of the transistor ML2. This low-side pre-driver makes the transistor ML2 on by feeding its gate with a high-level gate signal GL during the high-level period of the signal S253, and makes the transistor ML2 off by feeding its gate with a low-level gate signal GL during the low-level period of the signal S253. In Practical Example EX2_A, the high-level gate signal GL has the potential of the internal supply voltage Vreg and the low-level gate signal GL has the ground potential. The internal supply voltage Vreg is higher than the gate threshold voltage of the transistor MH2.

Specifically, the circuits 254 and 255 are inverter circuits. The circuits 254 and 255 each receive the signal S253 and output the inversion signal of the signal S253. The output signal of the circuit 254 is fed to the gate of the transistor 256 and the output signal of the circuit 255 is fed to the gate of the transistor 257. The source of the transistor 256 is connected to a wiring fed with the internal supply voltage Vreg to receive the internal supply voltage Vreg. The source of the transistor 257 is connected to the ground terminal $T_{GND}$. The drains of the transistors 256 and 257 are connected together, and are connected across a gate wring 258 to the gate of the transistor ML2. The signal that appears on the gate wring 258 is the gate signal GL.

The level shifter 261 is connected to a gate wiring 248 to receive the gate signal GH. The level shifter 261 shifts the level of the gate signal GH, which is a signal relative to the switching voltage $V_{LX}$, to obtain a signal relative to the ground potential, and thereby outputs the level-shifted gate signal GH as a signal GH'. In the following description, the signal GH' is occasionally called the shifted gate signal GH'. With respect to the shifted gate signal GH', high level has the potential of the internal supply voltage Vreg and low level has the ground potential. If the gate signal GH is at high level, the shifted gate signal GH' too is at high level and, if the gate signal GH is at low level, the shifted gate signal GH' too is at low level. Note here that, while the potential of the gate signal GH varies between the switching voltage $V_{LX}$ and the boot voltage $V_{BOOT}$, the potential of the shifted gate signal GH' varies between the ground potential and the potential of the internal supply voltage Vreg. As the potential of the gate signal GH falls from the potential of the boot voltage $V_{BOOT}$ to the potential of the switching voltage $V_{LX}$, the potential of the shifted gate signal GH' falls from the potential of the internal supply voltage Vreg to the ground potential. As the potential of the gate signal GH rises from the potential of switching voltage $V_{LX}$ to the potential of the boot voltage $V_{BOOT}$, the potential of the shifted gate signal GH' rises from the ground potential to the potential of the internal supply voltage Vreg. Typically, for example, the potential difference between the switching voltage $V_{LX}$ and the boot voltage $V_{BOOT}$ can be equal to the magnitude of the internal supply voltage Vreg. The potential of the signal GH' relative to the ground potential can be equal to the potential of the signal GH relative to the potential of the switching terminal $T_{LX}$. A intrinsic signal transmission delay is inherent also in the level shifter 261.

The circuit 231 is a Schmitt-trigger buffer circuit and the circuit 232 is a Schmitt-trigger inverter circuit. In the switching control circuit 200, the circuits 231 and 232 correspond to the circuits 11H and 11L, respectively, shown in FIG. 1, and the output signals of the circuits 231 and 232 correspond to the signals Hon and Loff respectively. Accordingly, in the switching control circuit 200, the up edge timings of the output signals of the circuits 231 and 232 correspond to the edge timings tHon and tLoff respectively (see FIG. 3).

The shifted gate signal GH' is received at the input terminal of the circuit 231. The circuit 231 outputs the signal Hon corresponding to the shifted gate signal GH'. Here, the voltage (potential) of the shifted gate signal GH' is called the shifted gate voltage and is identified by the symbol "$V_{GH}'$". Starting with a state where the signal Hon is at low level, when the shifted gate voltage $V_{GH}'$ rises above a predetermined positive threshold voltage $V_{TH231}$, an up edge occurs in the signal Hon; after that, when the shifted gate voltage $V_{GH}'$ falls below the voltage ($V_{TH231}-\Delta V_{HYS}$), a down edge occurs in the signal Hon. Here, the inequality $0<V_{TH231}-\Delta V_{HYS}<V_{TH231}<$Vreg holds. $\Delta V_{HYS}$ represents a positive hysteresis voltage. The threshold voltage $V_{TH231}$ can be determined such that the shifted gate voltage $V_{GH}'$ with the gate-source voltage of the transistor MH2 equal to the gate threshold voltage of the transistor MH2 is equal to or substantially equal to the threshold voltage $V_{TH231}$.

The input terminal of the circuit 232 is connected to the gate wring 258 to receive the gate signal GL. The circuit 232 outputs the signal Loff corresponding to the gate signal GL. As in Practical Example EX1_A, the voltage (potential) of the gate signal GL is called the gate voltage and is identified by the symbol "$V_{GL}$". Starting with a state where the signal Loff is at low level, when the gate voltage $V_{GL}$ falls below a predetermined positive threshold voltage $V_{TH232}$, an up edge occurs in the signal Loff; after that, when the gate voltage $V_{GL}$ rises above the voltage ($V_{TH232}+\Delta V_{HYS}$), a down edge occurs in the signal Loff. Here, the inequality $0<V_{TH232}<V_{TH232}+\Delta V_{HYS}<$Vreg holds. The threshold voltage $V_{TH232}$ can be determined such that the voltage $V_{TH232}$ is equal to or substantially equal to the gate threshold voltage of the transistor ML2.

The circuit 233 is a Schmitt-trigger inverter circuit and the circuit 234 is a Schmitt-trigger buffer circuit. In the switching control circuit 200, the circuits 233 and 234 correspond to the circuits 12H and 12L, respectively, in FIG. 1, and the output signals of the circuits 233 and 234 correspond to the signals Hoff and Lon respectively. Accordingly, in the switching control circuit 200, the up edge timings of the output signals of the circuits 233 and 234 correspond to the edge timings tHoff and tLon respectively (see FIG. 3).

The shifted gate signal GH' is received at the input terminal of the circuit 233. The circuit 233 outputs the signal Hoff corresponding to the shifted gate signal GH'. Starting with a state where the signal Hoff is at low level, when the shifted gate voltage $V_{GH}'$ falls below a predetermined positive threshold voltage $V_{TH233}$, an up edge occurs in the signal Hoff; after that, when the shifted gate voltage $V_{GH}'$ rises above the voltage ($V_{TH233}+\Delta V_{HYS}$), a down edge occurs in the signal Hoff. Here, the inequality $0<V_{TH233}<V_{TH233}+\Delta V_{HYS}<$Vreg holds. The threshold voltage $V_{TH233}$ can be determined such that the shifted gate voltage $V_{GH}'$ with the gate-source voltage of the transistor MH2 equal to the gate threshold voltage of the transistor MH2 is equal to or substantially equal to the threshold voltage $V_{TH233}$.

The input terminal of the circuit 234 is connected to the gate wring 258 to receive the gate signal GL. The circuit 234 outputs the signal Lon corresponding to the gate signal GL. Starting with a state where the signal Lon is at low level, when the gate voltage $V_{GL}$ rises above a predetermined positive threshold voltage $V_{TH234}$, an up edge occurs in the signal Lon; after that, when the gate voltage $V_{GL}$ falls below the voltage ($V_{TH234}-\Delta V_{HYS}$), a down edge occurs in the signal Lon. Here, the inequality $0<V_{TH234}-\Delta V_{HYS}<V_{TH234}<$Vreg holds. The threshold voltage $V_{TH234}$ can be determined such that the threshold voltage $V_{TH234}$ is equal to or substantially equal to the gate threshold voltage of the transistor ML2.

Based on the signals Hon and Loff from the circuits 231 and 232, the delay setting circuit 210 generates a signal S210 that specifies and controls the delay time Tdly_H2 in the delay adding circuit 211, and feeds the generated signal S210 to the delay adding circuit 211. The delay adding circuit 211 adds the delay time Tdly_H2 corresponding to the signal S210 to the drive control signal CNT. In Practical Example EX2_A, the adjustment circuit 21 (see FIG. 1) includes the circuits 210 to 212 and can further include all or some of the circuits 251 to 253.

Based on the signals Hoff and Lon from the circuits 233 and 234, the delay setting circuit 220 generates a signal S220 that specifies and controls the delay time Tdly_L2 in the delay adding circuit 221, and feeds the generated signal S220 to the delay adding circuit 221. The delay adding circuit 221 adds the delay time Tdly_L2 corresponding to the signal S220 to the drive control signal CNT. In Practical Example EX2_A, the adjustment circuit 22 (see FIG. 1) includes the circuits 220 to 222 and can further include all or some of the circuits 251 to 253.

Each time an up edge occurs in the drive control signal CNT, one up edge occurs in each of the signals Hon and Loff. The delay setting circuit 210 senses the relationship between the up edge timings tHon and tLoff of the signals Hon and Loff based on the up edge in the drive control signal CNT (see FIG. 3) and generates and outputs the signal S210 corresponding to the sensing result. What the delay setting circuit 210 senses includes the difference between the edge timings tHon and tLoff as well as the temporal order of the edge timings tHon and tLoff. The delay time Tdly_H2 in the delay adding circuit 211 depends on the signal S210. Here, the circuits 210 and 211 can change the delay time Tdly_H2 in such a way as to carry out the first dead time reduction operation mentioned above. The difference between the edge timings tHon and tLoff can be understood to be the difference between the phases of the up edges in the signals Hon and Loff.

Each time a down edge occurs in the drive control signal CNT, one up edge occurs in each of the signals Hoff and Lon. The delay setting circuit 220 senses the relationship between the up edge timings tHoff and tLon of the signals Hoff and Lon based on the down edge in the drive control signal CNT (see FIG. 3) and generates and outputs the signal S220 corresponding to the sensing result. What the delay setting circuit 220 senses includes the difference between the edge timings tHoff and tLon as well as the temporal order of the edge timings tHoff and tLon. The delay time Tdly_L2 in the delay adding circuit 221 depends on the signal S220. Here, the circuits 220 and 221 can change the delay time Tdly_L2 in such a way as to carry out the second dead time reduction operation mentioned above. The difference between the edge timings tHoff and tLon can be understood to be the difference between the phases of the up edges in the signals Hoff and Lon.

Figure 17:
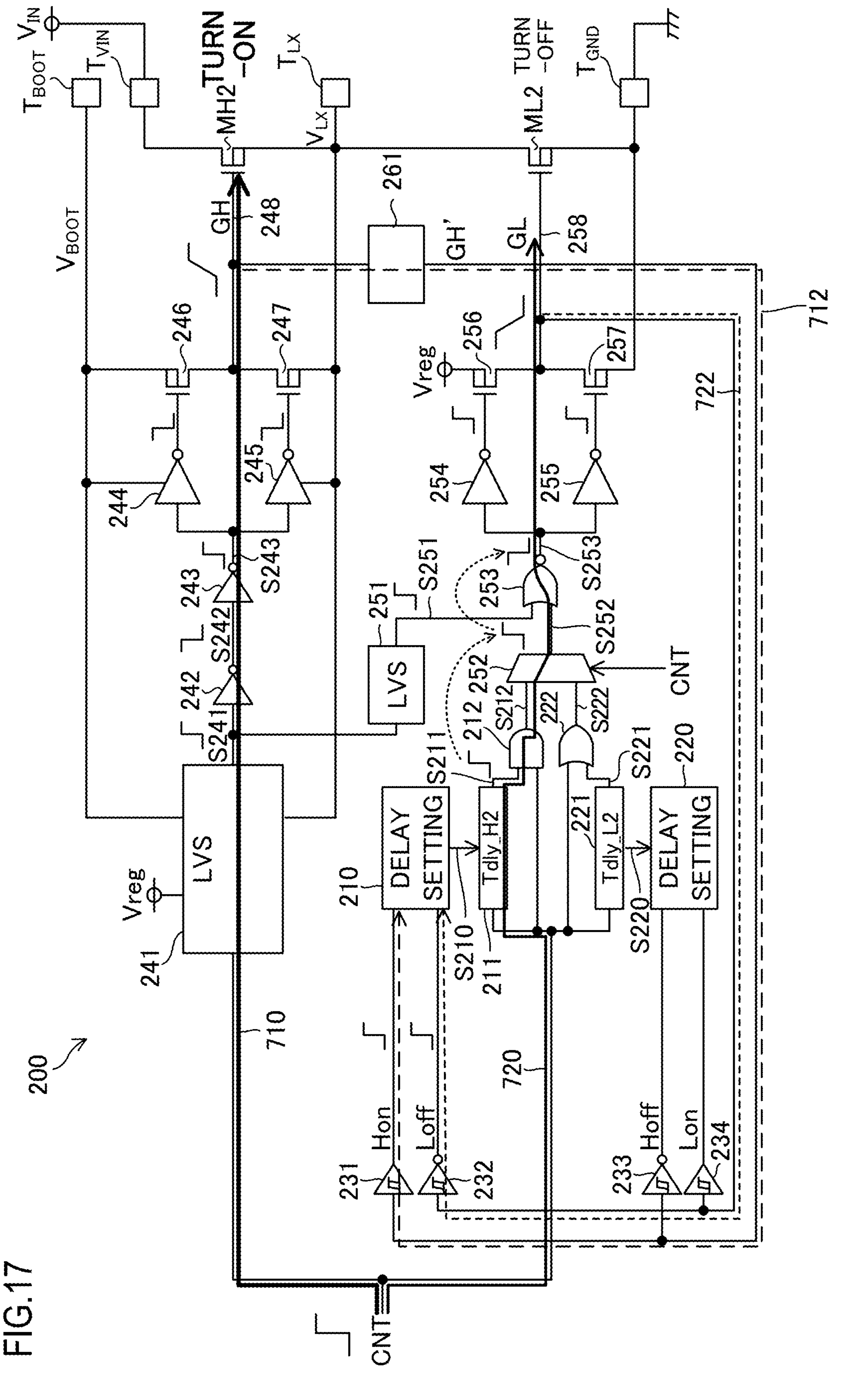
FIG. 17 is a diagram illustrating operation related to an up edge (rising edge) in a drive control signal according to Practical Example EX2_A of the present disclosure.
Figure 18:
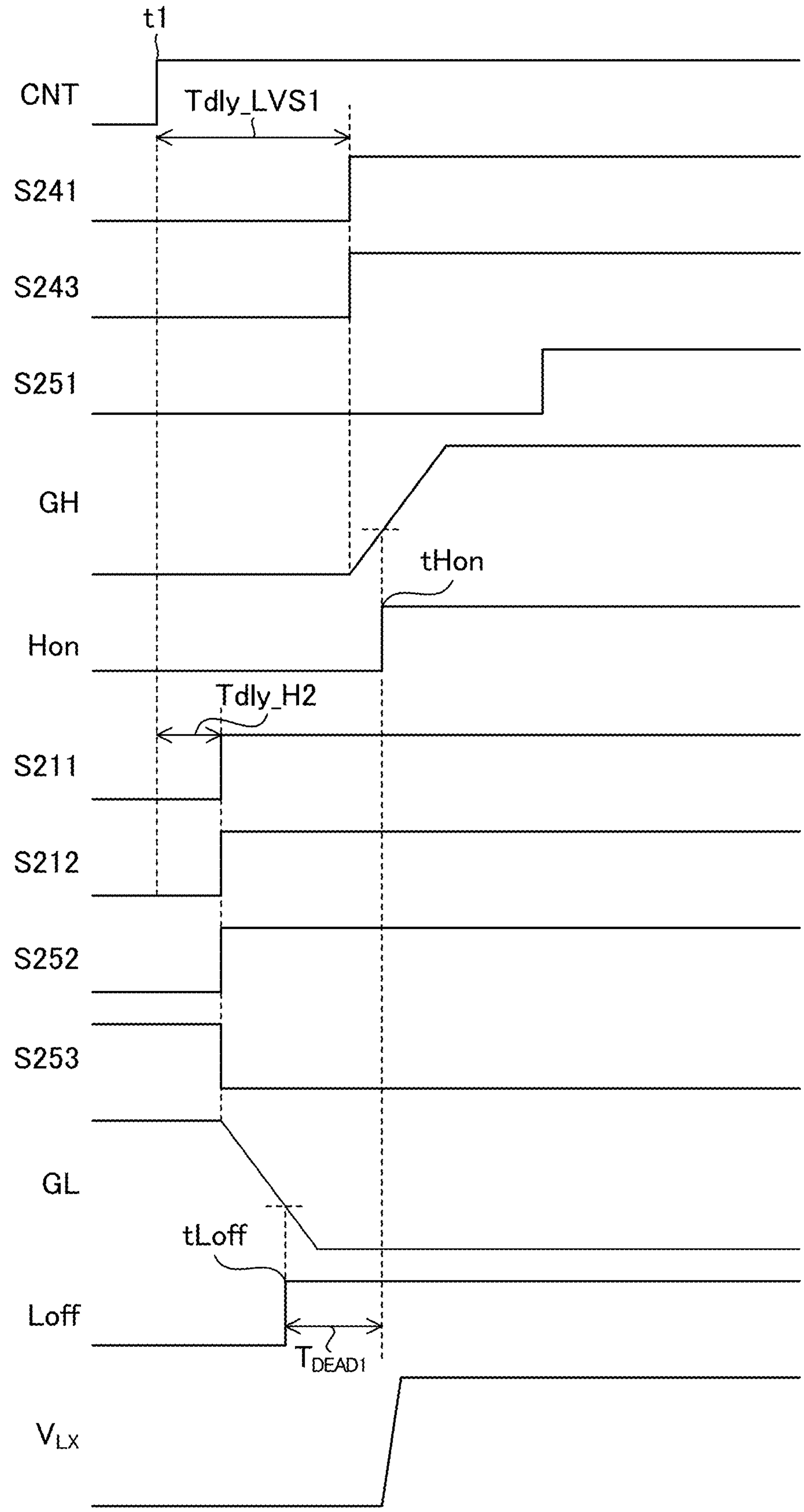
FIG. 18 is a timing chart related to an up edge (rising edge) in a drive control signal according to Practical Example EX2_A of the present disclosure.

With reference to FIGS. 17 and 18, the operation of the switching control circuit 200 in response to an up edge in the drive control signal CNT will be described. In FIG. 17, an arrowed solid line 710 indicates the transmission path of a signal that causes a potential rise in the gate signal GH in response to an up edge in the drive control signal CNT. In FIG. 17, an arrowed broken line 712 indicates how a signal corresponding to a turn-on of the transistor MH2 is transmitted to the delay setting circuit 210. In FIG. 17, an arrowed solid line 720 indicates the transmission path of a signal that causes a potential fall in the gate signal GL in response to an up edge in the drive control signal CNT. In FIG. 17, an arrowed broken line 722 indicates how a signal corresponding to a turn-off of the transistor ML2 is transmitted to the delay setting circuit 210.

FIG. 18 is a timing chart of the switching control circuit 200 in response to an up edge in the drive control signal CNT. In the initial delay state immediately after the start-up of the switching IC 1, a predetermined sufficiently short initial time is set as the delay time Tdly_H2 so as to ensure that the delay time Td_Hon is longer than the delay time Td_Loff (i.e., to ensure that $T_{DEAD1}>0$; see FIG. 3). That is, in the initial delay state, the delay time Tdly_H2 is set to be sufficiently shorter than the transmission delay time Tdly_LVS1 in the level shifter 241. FIG. 18 is a timing chart as observed in the initial delay state or as observed when the first dead time $T_{DEAD1}$ is sufficiently long.

Referring to FIG. 18, at time point t1, an up edge occurs in the drive control signal CNT (see also FIG. 3). Then, at the lapse of the transmission delay time Tdly_LVS1 from time point t1, an up edge occurs in the signal S241. On the other hand, at the lapse of the delay time Tdly_H2 from time point t1, an up edge occurs in the signal S211. In synchronization with the up edge in the signal S211, an up edge occurs also in the signal S212. As described above, if the drive control signal CNT is at high level, the selector 252 selects the signal S212. Accordingly, the up edge in the signal S211 produces, via the circuit 212 and the selector 252, an up edge in the signal S252. At this stage, no up edge has yet occurred in the signal S241, and an up edge in the signal S251 occurs later than an up edge in the signal S241. Thus, the NOR circuit 253 so functions that, in synchronization with the up edge in the signal S252, a down edge occurs in the signal S253. In response to the down edge in the signal S253, the low-side pre-driver (254 to 257) described above lowers the potential of the gate signal GL from high level (the level of the internal supply voltage Vreg) toward low level (the level of the ground). In the course of the potential fall in the gate signal GL, at timing tLoff, an up edge occurs in the signal Loff.

On the other hand, the up edge in the signal S241 produces, via the circuits 242 and 243, an up edge in the signal S243. In response to the up edge in the signal S243, the high-side pre-driver (244 to 247) mentioned above raises the potential of the gate signal GH from low level (the level of the switching voltage $V_{LX}$) toward high level (the level of the boot voltage $V_{BOOT}$). In the course of the potential rise in the gate signal GH, via the level shifter 261 and the circuit 231, at timing tHon, an up edge occurs in the signal Hon.

In a situation where the edge timing tLoff is earlier than the edge timing tHon (i.e., in a situation where the phase of the up edge in the signal Loff leads ahead of the phase of the up edge in the signal Hon), when a signal S210 corresponding to the difference between the edge timings tLoff and tHon is fed to the delay adding circuit 211, the delay adding circuit 211 increases the delay time Tdly_H2. The amount of increase here can increase as the difference between the edge timings tLoff and tHon increases (i.e., as the first dead time $T_{DEAD1}$ increases), or can be constant.

As, starting with the initial delay state, the drive control signal CNT is switched between high and low levels repeatedly, according to the difference between the edge timings tLoff and tHon, the delay time Tdly_H2 keeps increasing until it stabilizes in a state where the difference between the edge timings tLoff and tHon is zero or insignificantly small.

With attention paid to the up edge in the drive control signal CNT, the delay adding circuit 211 is an example of a variable delay circuit that outputs an active signal at the lapse of a variable delay time Tdly_H2 from the up edge in the drive control signal CNT. The active signal here corresponds to the high-level signal S211. Based on the active signal (when triggered by the output of the active signal), the switching control circuit 200 turns off the transistor ML2 by feeding it with the gate signal GL that lowers the gate potential of the transistor ML2. On the other hand, in response to the level change in the signal S241 (shifted drive control signal) based on the up edge in the drive control signal CNT, the switching control circuit 200 turns on the transistor MH2 by feeding it with the gate signal GH that raises the gate potential of the transistor MH2. Then, starting with the state where Td_Hon>Td_Loff (see FIGS. 3 and 18), the adjustment circuit (21) including the delay setting circuit 210 and the delay adding circuit 211 increases the delay time Tdly_H2 based on the difference between the edge timings tHon and tLoff so as to increase the delay time Td_Loff, and can thereby decrease the first dead time $T_{DEAD1}$.

The delay time Tdly_H2, which corresponds to an added delay time, is part of the total delay time (i.e., the delay time Td_Loff) at the turn-off of the transistor ML2. Accordingly, as the delay time Tdly_H2 increases and decreases, the delay time Td_Loff too increases and decreases. On the other hand, the transmission delay time Tdly_LVS1 in the LVS 241 is part of the total delay time (i.e., the delay time Td_Hon) at the turn-on of the transistor MH2. Note that, if, for the sake of discussion, the delay time Tdly_H2 becomes so long that the edge timing tHon is earlier than the edge timing tLoff, based on the signals Hon and Loff, the delay setting circuit 210 and the delay adding circuit 211 correct the delay time Tdly_H2 by decreasing it.

Figure 19:
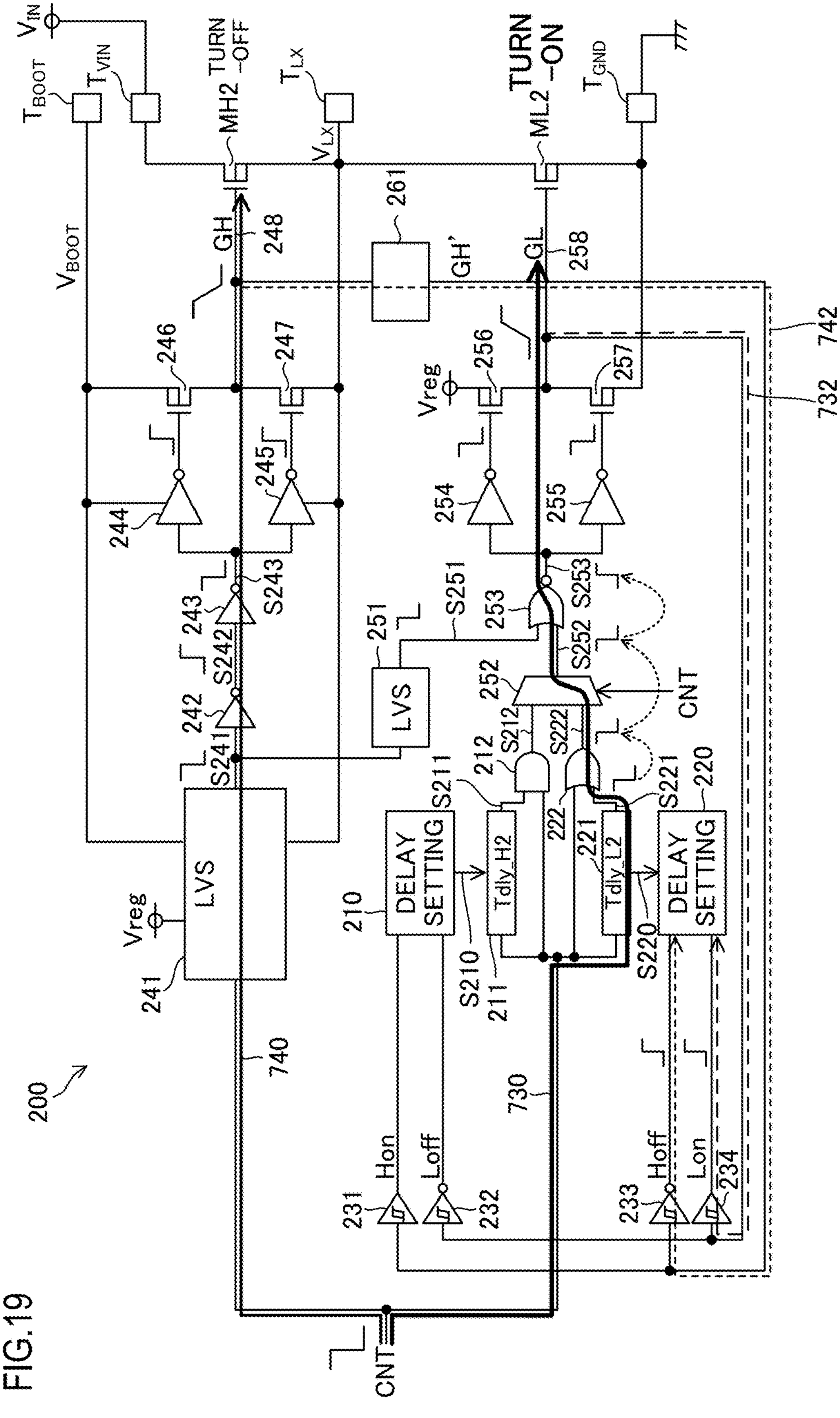
FIG. 19 is a diagram illustrating operation related to a down edge (falling edge) in a drive control signal according to Practical Example EX2_A of the present disclosure.
Figure 20:
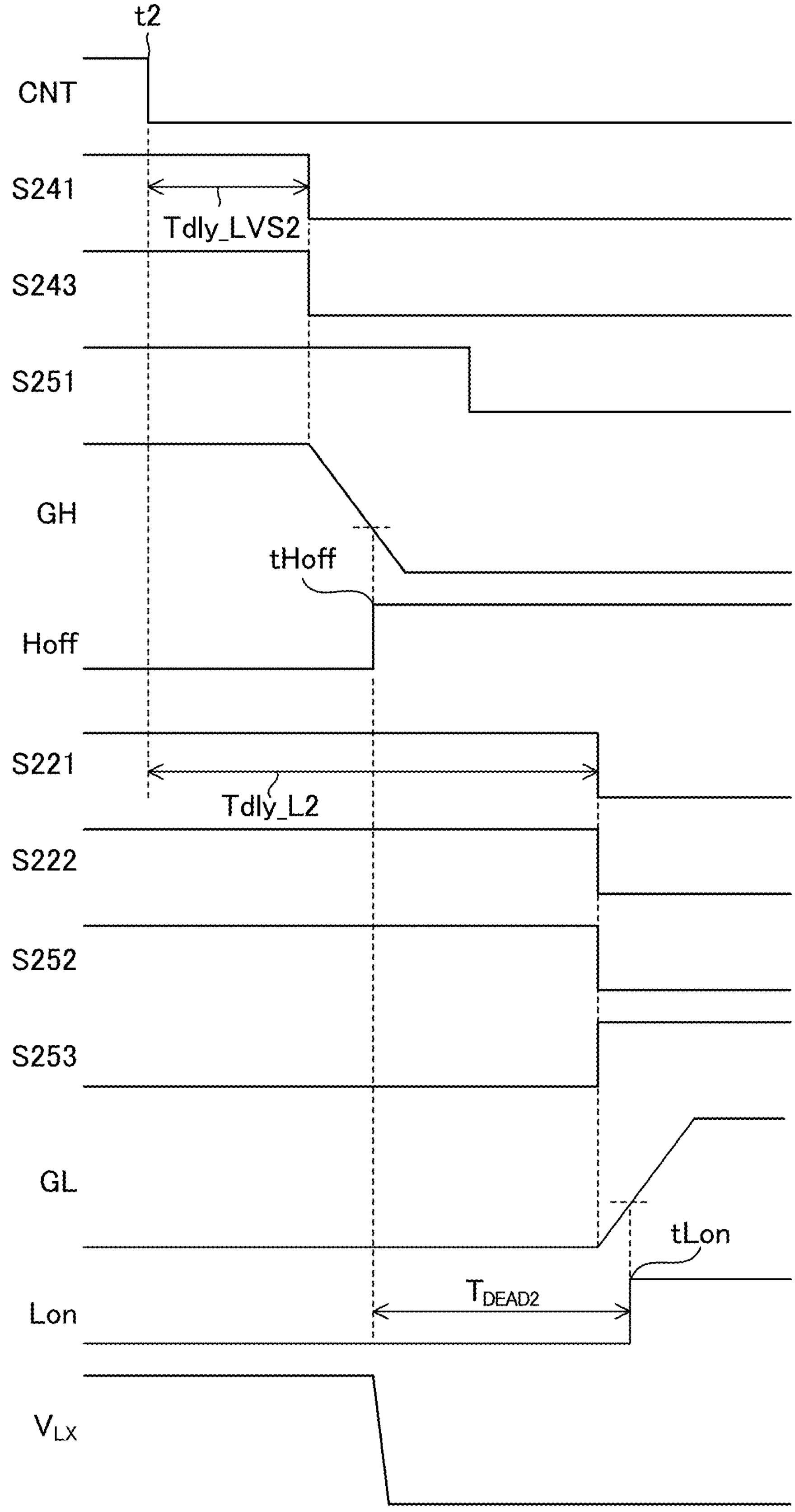
FIG. 20 is a timing chart related to a down edge (falling edge) in a drive control signal according to Practical Example EX2_A of the present disclosure.

With reference to FIGS. 19 and 20, the operation of the switching control circuit 200 in response to a down edge in the drive control signal CNT will be described. In FIG. 19, an arrowed solid line 730 indicates the transmission path of a signal that causes a potential rise in the gate signal GL in response to a down edge in the drive control signal CNT. In FIG. 19, an arrowed broken line 732 indicates how a signal corresponding to a turn-on of the transistor ML2 is transmitted to the delay setting circuit 220. In FIG. 19, an arrowed solid line 740 indicates the transmission path of a signal that causes a potential fall in the gate signal GH in response to a down edge in the drive control signal CNT. In FIG. 19, an arrowed broken line 742 indicates how a signal corresponding to a turn-off of the transistor MH2 is transmitted to the delay setting circuit 220.

FIG. 20 is a timing chart of the switching control circuit 200 in response to a down edge in the drive control signal CNT. In the initial delay state immediately after the start-up of the switching IC 1, a predetermined sufficiently long initial time is set as the delay time Tdly_L2 so as to ensure that the delay time Td_Lon is longer than the delay time Td_Hoff (i.e., to ensure that $T_{DEAD2}>0$; see FIG. 3). That is, in the initial delay state, the delay time Tdly_L2 is set to be sufficiently longer than the transmission delay time Tdly_LVS2 in the level shifter 241. FIG. 20 is a timing chart as observed in the initial delay state or as observed when the second dead time $T_{DEAD2}$ is sufficiently long.

Referring to FIG. 20, at time point t2, a down edge occurs in the drive control signal CNT (see also FIG. 3). Then, at the lapse of the transmission delay time Tdly_LVS2 from time point t2, a down edge occurs in the signal S241. The down edge in the signal S241 produces, via the circuits 242 and 243, a down edge in the signal S243. In response to the down edge in the signal S243, the high-side pre-driver (244 to 247) mentioned above lowers the potential of the gate signal GH from high level (the level of the boot voltage $V_{BOOT}$) toward low level (the level of the switching voltage $V_{LX}$). In the course of the potential fall in the gate signal GH, via the level shifter 261 and the circuit 233, at timing tHoff, an up edge occurs in the signal Hoff.

On the other hand, at the lapse of the delay time Tdly_L2 from time point t2, a down edge occurs in the signal S221. In synchronization with the down edge in the signal S221, a down edge occurs also in the signal S222. As described above, if the drive control signal CNT is at low level, the selector 252 selects the signal S222. Accordingly, the down edge in the signal S221 produces, via the circuit 222 and the selector 252, a down edge in the signal S252. While a down edge in the signal S251 can occur later than the down edge in the signal S252, at least in the initial delay state, the down edge in the signal S252 occurs later than a down edge in the signal S251. Accordingly, the NOR circuit 253 so functions that, in synchronization with the down edge in the signal S252, an up edge occurs in the signal S253. In response to the up edge in the signal S253, the low-side pre-driver (254 to 257) raises the potential of the gate signal GL from low level (the level of the ground) toward high level (the level of the internal supply voltage Vreg). In the course of the potential rise in the gate signal GL, at timing tLon, an up edge occurs in the signal Lon.

In a situation where the edge timing tHoff is earlier than the edge timing tLon (i.e., in a situation where the phase of the up edge in the signal Hoff leads ahead of the phase of the up edge in the signal Lon), when a signal S220 corresponding to the difference between the edge timings tHoff and tLon is fed to the delay adding circuit 221, the delay adding circuit 221 decreases the delay time Tdly_L2. The amount of decrease here can increase as the difference between the edge timings tHoff and tLon increases (i.e., as the second dead time $T_{DEAD2}$ increases), or can be constant.

As, starting with the initial delay state, the drive control signal CNT is switched between high and low levels repeatedly, according to the difference between the edge timings tHoff and tLon, the delay time Tdly_L2 keeps decreasing until it stabilizes in a state where the difference between the edge timings tHoff and tLon is zero or insignificantly small.

With attention paid to the down edge in the drive control signal CNT, the delay adding circuit 221 is an example of a variable delay circuit that outputs an active signal at the lapse of a variable delay time Tdly_L2 from the down edge in the drive control signal CNT. The active signal here corresponds to the low-level signal S221. Based on the active signal (when triggered by the output of the active signal), the switching control circuit 200 turns on the transistor ML2 by feeding it with the gate signal GL that raises the gate potential of the transistor ML2. On the other hand, in response to the level change in the signal S241 (shifted drive control signal) based on the down edge in the drive control signal CNT, the switching control circuit 200 turns off the transistor MH2 by feeding it with the gate signal GH that lowers the gate potential of the transistor MH2. Then, starting with the state where Td_Lon>Td_Hoff (see FIGS. 3 and 20), the adjustment circuit (22) including the delay setting circuit 220 and the delay adding circuit 221 decreases the delay time Tdly_L2 based on the difference between the edge timings tHoff and tLon so as to decrease the delay time Td_Lon, and can thereby decrease the second dead time $T_{DEAD2}$.

The delay time Tdly_L2, which corresponds to an added delay time, is part of the total delay time (i.e., the delay time Td_Lon) at the turn-on of the transistor ML2. Accordingly, as the delay time Tdly_L2 increases and decreases, the delay time Td_Lon too increases and decreases. On the other hand, the transmission delay time Tdly_LVS2 in the LVS 241 is part of the total delay time (i.e., the delay time Td_Hoff) at a turn-off of the transistor MH2. Note that, if, for the sake of discussion, the delay time Tdly_L2 becomes so short that the edge timing tLon is earlier than the edge timing tHoff, based on the signals Lon and Hoff, the delay setting circuit 220 and the delay adding circuit 221 correct the delay time Tdly_L2 by increasing it.

The delay setting circuits 210 and 220 can be configured similarly to the delay setting circuits 110 and 120 (see FIG. 10) described in connection with Practical Example EX1_A. Accordingly, no illustration will be given of a specific configuration example of the delay setting circuits 210 and 220.

Practical Example EX2_B

Practical Example EX2_B will be described. Practical Example EX2_B is based on Practical Example EX2_A. Unless inconsistent, for any features of Practical Example EX2_B that are not specifically mentioned, the description of the corresponding features of Practical Example EX2_A applies to Practical Example EX2_B.

Figure 21:
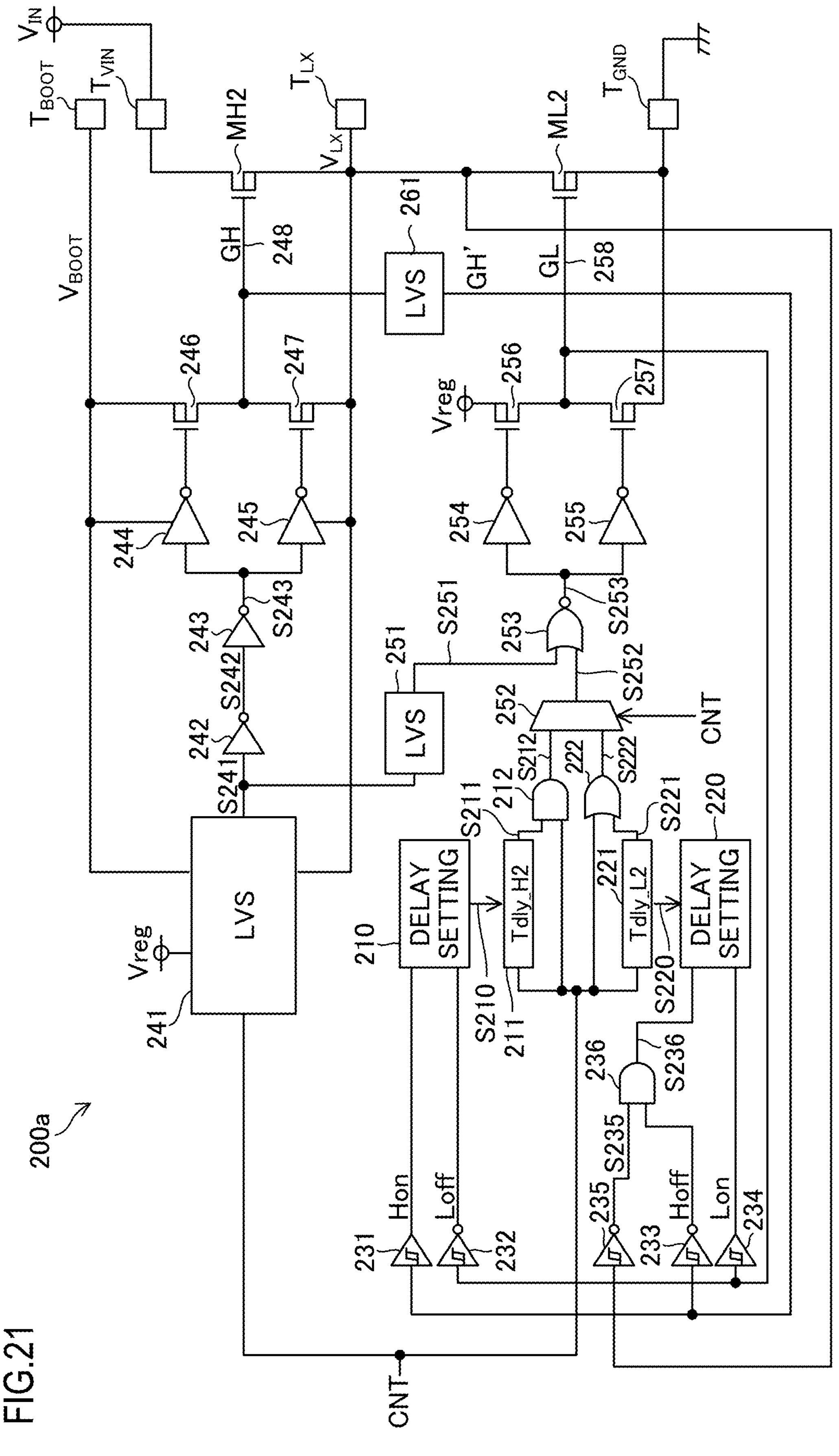
FIG. 21 is a diagram showing a configuration of a switching control circuit according to Practical Example EX2_B of the present disclosure.

FIG. 21 shows part of the internal circuit of a switching IC 1 according to Practical Example EX2_B. In the switching IC 1 of Practical Example EX2_B, the switching control circuit 10 appears as a switching control circuit 200*a* and the transistors MH and ML appear as transistors MH2 and ML2 respectively. As compared with the switching control circuit 200 (FIG. 16) of Practical Example EX2_A, the switching control circuit 200*a* has a configuration that further incudes circuits 235 and 236. Except for this addition and the features described below in connection with Practical Example EX2_B, the configuration and the operation of the switching control circuit 200*a* are the same as those of the switching control circuit 200.

The circuit 235 is a Schmitt-trigger inverter circuit (in other words, an inverter circuit with hysteresis). The input terminal of the circuit 235 is connected to the switching terminal $T_{LX}$ to receive the switching voltage $V_{LX}$. The circuit 235 outputs a signal S235 corresponding to the switching voltage $V_{LX}$. Starting with a state where the signal S235 is at low level, when the switching voltage $V_{LX}$ falls below a positive threshold voltage $V_{TH235}$, an up edge occurs in the signal S235; after that, when the switching voltage $V_{LX}$ rises above the voltage ($V_{TH235}+\Delta V_{HYS}$), a down edge occurs in the signal S235. Here, the inequality $0<V_{TH235}<V_{TH235}+\Delta V_{HYS}<Vreg$ holds.

The circuit 236 is a two-input AND circuit. The circuit 235 outputs, as a signal S236, the AND signal of the signal S235 from the circuit 235 and the signal Hoff from the circuit 233. Accordingly, only if the signals S235 and Hoff are both at high level is the signal S236 at high level. If at least one of the signals S235 and Hoff is at low level, the signal S236 is at low level.

In Practical Example EX2_B, the delay setting circuit 220 is fed with, instead of the combination of the signals Hoff and Lon, the signals S236 and Lon. That is, in Practical Example EX2_B, the delay setting circuit 220 generates and outputs the signal S220 not based on the signals Hoff and Lon but based on the signals S236 and Lon. In Practical Example EX2_B, the delay setting circuit 220 regards the signal S236 as the signal Hoff (i.e., it takes the up edge timing of the signal S236 as the up edge timing of the signal Hoff) and generates and outputs the signal S220 in a manner similar to that in Practical Example EX2_A, thereby specifying and controlling the delay time Tdly_L2 to be added in the delay adding circuit 221.

Assume that the switching IC 1 according to Practical Example EX2_B is incorporated in the DC/DC converter 2 (FIG. 4). In that case, the circuits 235 and 236 bring about effects similar to those brought about by the circuits 135 and 136 (FIG. 11) in the Practical Example EX1_B. Specifically, in a heavy-load condition where the load current $I_{LD}$ is comparatively high, the switching control circuit 200*a* operates substantially in the same manner as the switching control circuit 200. By contrast, in a light-load condition where the load current $I_{LD}$ is comparatively low, the fall of the switching voltage $V_{LX}$ resulting from a turning-off of the transistor MH2 is gentler than in the heavy-load condition. When the switching voltage $V_{LX}$ falls sufficiently, an up edge occurs in the signal S235 and, triggered by the up edge in the signal S235, an up edge occurs also in the signal S236. For the sake of discussion, if, while the switching voltage $V_{LX}$ is falling in the light-load condition, the transistor ML2 is turned on with the switching voltage $V_{LX}$ sufficiently high, electric charge is drawn into the ground across the channel of the transistor ML2 and the switching voltage $V_{LX}$ falls sharply to 0 V. This is as good as unnecessarily drawing electric charge into the ground (that is, wasting electric charge), and leads to a drop in efficiency.

In the switching control circuit 200*a*, the circuits 235 and 236 provided in it serve to prevent a drop in efficiency in the light-load condition, in other words, improve efficiency in the light-load condition. The improved efficiency is achieved through correction of the delay time Tdly_L2 based on the signals S236 and Lon. In the following description, the up edge timing of the signal S236 is identified by the symbol "t236" and is referred to as the edge timing t236 or the timing t236.

Figure 22:
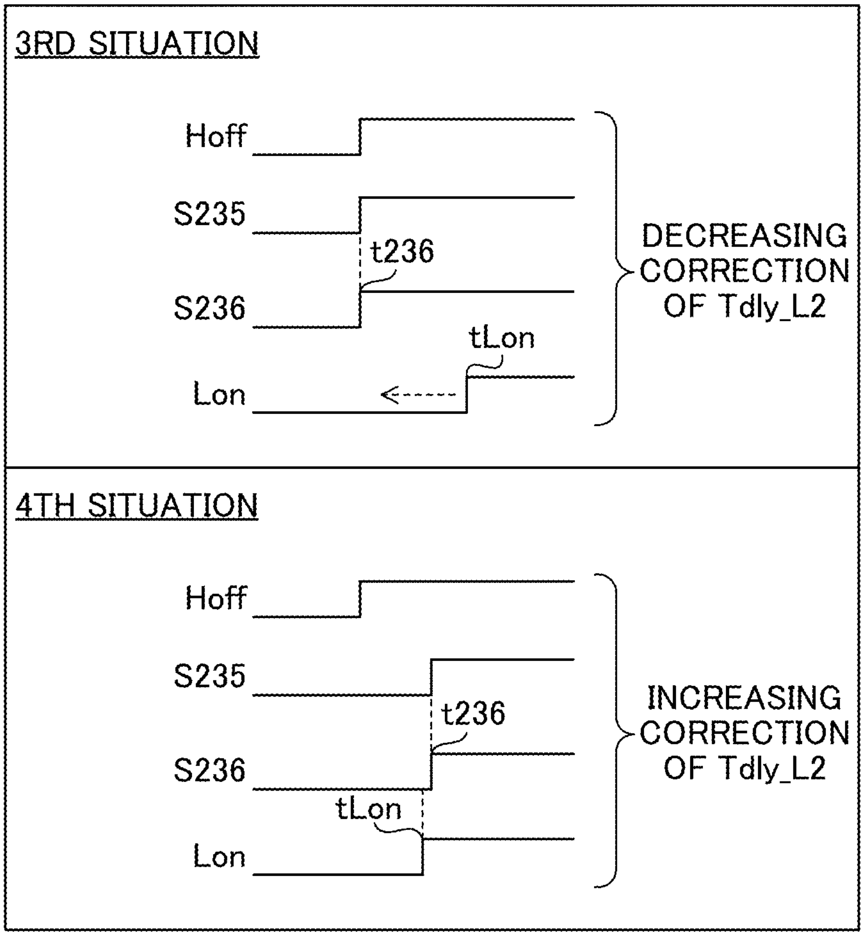
FIG. 22 is a diagram illustrating a method of adjusting an added delay time according to Practical Example EX2_B of the present disclosure.

The delay setting circuit 220 senses the relationship between the edge timings t236 and tLon and generates and outputs the signal S220 corresponding to the sensing result. What the delay setting circuit 220 senses includes the difference between the edge timings t236 and tLon as well as the temporal order of the edge timings t236 and tLon. Now, with reference to FIG. 22, the operation of the delay setting circuit 220 and the delay adding circuit 221 in the switching control circuit 200*a* will be described.

In the heavy-load condition, the edge timings tHoff and t236 substantially coincide and thus the switching control circuit 200*a* operates in a similar manner as in Practical Example EX2_A. Specifically, in a third situation where the edge timing t236 is earlier than the edge timing tLon (a situation where the phase of the up edge in the signal S236 leads ahead of the phase of the up edge in the signal Lon), the delay setting circuit 220 generates and outputs the signal S220 to decrease the delay time Tdly_L2 and, in response to this signal S220, the delay adding circuit 221 decreases the delay time Tdly_L2. The amount of decrease here can increase as the difference between the edge timings t236 and tLon increases, or can be constant.

Starting with the initial delay state, the drive control signal CNT is switched between high and low level repeatedly. If the heavy-load condition persists, according to the difference between the edge timings t236 and tLon, the delay time Tdly_L2 keeps decreasing until it stabilizes in a state where the difference between the edge timings t236 and tLon is zero or insignificantly small.

Suppose now that, afterward, a switch from the heavy-load condition to the light-load condition has taken place. The switch to the light-load condition results in the edge timing t236 occurring later than in the heavy-load condition, bringing a fourth situation where the edge timing t236 occurs accordingly later than the edge timing tHoff (a situation where the phase of the up edge in the signal S236 lags behind the phase of the up edge in the signal Hoff). In the fourth situation, the turning-off of the transistor MH2 alone does not allow the switching voltage $V_{LX}$ to fall sufficiently, and thus the signal S235 is kept at low level. Then the gate signal GL across the transmission path 730 (see FIG. 19) turns on the transistor ML2, and the fall of the switching voltage $V_{LX}$ resulting from the turning-on of the transistor ML2 produces an up edge in the signal S235 and subsequently an up edge in the signal S236. That is, in the fourth situation, the edge timing t236 occurs later than the edge timing tLon (the phase of the up edge in the signal S236 lags behind the phase of the up edge in the signal Lon). With the edge timing t236 occurring later than the edge timing tLon, the delay setting circuit 220 generates the signal S220 to increase the delay time Tdly_L2 and, in response to this signal S220, the delay adding circuit 221 increases the delay time Tdly_L2. The amount of increase here can be an amount corresponding to the difference between the edge timings t236 and tLon, or can be constant. As the delay time Tdly_L2 increases, the second dead time $T_{DEAD2}$ increases but this, in the light-load condition, rather increases efficiency.

If after the transition to the fourth situation the light-load condition persists, the delay time Tdly_L2 keeps increasing. As a result, in the light-load condition, the ML2 is turned on after the switching voltage $V_{LX}$ has fallen sufficiently, and this suppresses a drop in efficiency as mentioned above. An upper limit can be set on the increase of the delay time Tdly_L2 (the delay time Tdly_L2 can be restrained from increasing above a predetermined upper-limit time). If after that a return from the light-load condition to the heavy-load condition takes place, the delay time Tdly_L2 is decreased to cope with the heavy-load condition. That is, the delay time Tdly_L2 is adjusted optimally according to the load current $I_{LD}$.

As described above, in Practical Example EX2_B, owing to the adjustment circuit 22 (see FIG. 1) configured to include the delay setting circuit 220 and the delay adding circuit 221, the second dead time $T_{DEAD2}$ is adjusted based on the signal Hoff, the signal Lon, and the signal S235 corresponding to the switching voltage $V_{LX}$. The delay time Td_Lon (FIG. 3) occurs across the transmission path 730 in FIG. 19 and thus, through the increasing and decreasing of the delay time Tdly_L2, the delay time Td_Lon involved in the turning-on of the transistor ML2 is increased and decreased. As the delay time Td_Lon is increased and decreased, the second dead $T_{DEAD2}$ time increases and decreases (see FIG. 3).

Practical Example EX2_C

Practical Example EX2_C will be described. Practical Example EX2_C deals with modified technologies and the like in connection with Practical Example EX2_A or EX2_B.

As mentioned earlier, the delay setting circuits 210 and 220 can be configured similarly to the delay setting circuits 110 and 120. However, in Practical Example EX2_A or EX2_B, so long as a signal corresponding to the relationship between the edge timings tLoff and tHon (their difference and temporal order) can be generated as the signal S210, the delay setting circuit 210 can be configured with any digital or analog circuit. In Practical Example EX2_A, so long as a signal corresponding to the relationship between the edge timings tHoff and tLon (their difference and temporal order) can be generated as the signal S220, the delay setting circuit 220 can be configured with any digital or analog circuit. In Practical Example EX2_B, so long as a signal corresponding to the relationship between the edge timings t236 and tLon (their difference and temporal order) can be generated as the signal S220, the delay setting circuit 220 can be configured with any digital or analog circuit.

In Practical Example EX2_A or EX2_B, the transistors MH2 and ML2 can each be implemented with an N-channel IGBT. In that case, in Practical Example EX2_A or EX2_B, the source and the drain of the transistor MH2 are to be read as the emitter and the collector respectively, and the source and the drain of the transistor ML2 are to be read as the emitter and the collector respectively.

Practical Example EX3

Practical Example EX3 will be described. Practical Example EX3 deals with applied technologies, modified technologies, additional features, or the like in connection with what has been described above.

The switching IC 1 is an example of a switching device according to the present disclosure. While the above description deals with an example in which the switching IC 1 is incorporated in a DC/DC converter 2, the application target of the switching IC 1 is not limited to DC/DC converters. For example, the switching IC 1 can be used as a motor driver. In that case, a motor driver IC can be configured to include, for each of three phases, a block comprising a half-bridge circuit composed of transistors MH and ML along with a switching control circuit 10 so that the motor driver IC can drive a three-phase motor. Such a motor driver IC also is a example of a switching device.

For any signal or voltage, unless inconsistent with what is disclosed herein, the relationship between its high and low levels can be reversed as compared with what is specifically described above.

The channel type of any FET (field-effect transistor) mentioned in connection with the embodiments is merely illustrative. The channel type of any FET may be changed between P- and N-channel types unless inconsistent with what is disclosed herein.

Unless any inconvenience arises, any of the transistors mentioned above may be of any type. For example, unless any inconvenience arises, any transistor mentioned above as a MOSFET may be replaced with a junction FET, an IGBT (insulated-gate bipolar transistor), or a bipolar transistor. Any transistor has a first electrode, a second electrode, and a control electrode. In an FET, of the first and second electrodes one is the drain and the other is the source, and the control electrode is the gate. In an IGBT, of the first and second electrodes one is the collector and the other is the emitter, and the control electrode is the gate. In a bipolar transistor that is not classified as an IGBT, of the first and second electrodes one is the collector and the other is the emitter, and the control electrode is the base.

In the present disclosure, wherever a first physical quantity and a second physical quantity are mentioned to be "the same", it is to be understood to allow for an error. That is, wherever a first physical quantity and a second physical quantity are mentioned to be "the same", it means that designing or manufacturing is done with an aim of making the first and second physical quantities "the same"; thus even if in reality there is an error between the first and second physical quantities, these are to be understood to be "the same". Any terms equivalent to "the same" (e.g., "identical", "equal", "coincident" etc.) are to be understood similarly.

Embodiments of the present disclosure can be modified in many ways as necessary without departure from the scope of the technical ideals defined in the appended claims. The embodiments described herein are merely examples of how the present invention can be implemented, and what is meant by any of the terms used to describe the present invention and its constituent elements is not limited to that mentioned in connection with the embodiments. The specific values mentioned in the above description are merely illustrative and needless to say can be modified to different values.

Notes

To follow are notes on the present disclosure of which specific configuration examples have been described by way of practical examples above.

According to one aspect of the present disclosure, a switching device (1; see FIGS. 1 and 3) includes: a first transistor (MH); a second transistor (ML) disposed on the lower-potential side of the first transistor and connected in series with the first transistor; and a switching control circuit (10) configured to turn on and off the first transistor by feeding the first transistor with a first gate signal (GH), and to turn on and off the second transistor by feeding the second transistor with a second gate signal (GL), according to a drive control signal (CNT). In response to a change of the level of the drive control signal from a first level to a second level, the switching control circuit, at the lapse of a first delay time (Td_Hon), turns on the first transistor and, at the lapse of a second delay time (Td_Loff), turns off the second transistor. The switching control circuit includes: a first sense circuit (11H) configured to sense, based on the first gate signal, a first timing (tHon) at which the first transistor turns on; a second sense circuit (11L) configured to sense, based on the second gate signal, a second timing (tLoff) at which the second transistor turns off; and an adjustment circuit (21) configured to change, starting with a reference state where the first delay time is longer than the second delay time, at least one of the first and second delay times based on the difference between the first and second timings and thereby decrease a dead time ($T_{DEAD1}$) between the turning-off of the second transistor and the turning-on of the first transistor. (A first configuration.)

It is thus possible to reduce a dead time under varying conditions. Reducing the dead time helps reduce loss (in other words, helps improve efficiency).

In the switching device of the first configuration described above (Practical Example EX1_A; see FIGS. 5 to 7), the first transistor (MH1) can be a P-channel field-effect transistor or a P-channel insulated-gate bipolar transistor and the second transistor (ML1) can be an N-channel field-effect transistor or an N-channel insulated-gate bipolar transistor. The adjustment circuit (110 to 112) can include a variable delay circuit (111) configured to output an active signal (in the example in FIG. 6, a high-level S111) at the lapse of a variable time (Tdly_H1) from the change of the drive control signal to the second level. The switching control circuit can feed, based on the active signal, the first gate signal that lowers the gate potential of the first transistor to the first transistor and thereby turn on the first transistor. The adjustment circuit can decrease, starting with the reference state, the variable time (Tdly_H1) in the variable delay circuit based on the difference between the first and second timings so as to decrease the first delay time (Td_Hon) and thereby decrease the dead time ($T_{DEAD1}$). (A second configuration.)

It is thus possible to reduce a dead time under varying conditions.

In the switching device of the first configuration described above (Practical Example EX2_A; see FIGS. 16 to 18), the first and second transistors (MH2 and MHL) can both be N-channel field-effect transistors or N-channel insulated-gate bipolar transistors. The switching control circuit can include a level shifter (241) configured to shift the level of the drive control signal (CNT) from a level relative to the ground potential to a level relative to the potential ($V_{LX}$) at the connection node between the first and second transistors and thereby generate a shifted drive control signal (S241). The switching control circuit can feed, in response to a change of the level of the shifted drive control signal based on the change of the drive control signal to the second level, the first gate signal that raises the gate potential of the first transistor to the first transistor and thereby turn on the first transistor, The adjustment circuit (210 to 212) can include a variable delay circuit (211) configured to output an active signal (in the example in FIG. 17, a high-level S211) at the lapse of a variable time (Tdly_H2) from the change of the drive control signal to the second level The switching control circuit feeds, based on the active signal, the second gate signal that lowers the gate potential of the second transistor to the second transistor and thereby turn off the second transistor. The adjustment circuit increases, starting with the reference state, the variable time (Tdly_H2) in the variable delay circuit based on the difference between the first and second timings so as to increase the second delay time (Td_Loff) and thereby decrease the dead time ($T_{DEAD1}$). (A third configuration.)

It is thus possible to reduce a dead time under varying conditions.

In the switching device of the first configuration described above (see FIGS. 1 and 3), the adjustment circuit can be a first adjustment circuit (21). In response to a change of the level of the drive control signal from the second level to the first level, the switching control circuit can, at the lapse of a third delay time (Td_Hoff), turn off the first transistor and, at the lapse of a fourth delay time (Td_Lon), turn on the second transistor. The switching control circuit can further include: a third sense circuit (12H) configured to sense, based on the first gate signal, a third timing (tHoff) at which the first transistor turns off; a fourth sense circuit (12L) configured to sense, based on the second gate signal, a fourth timing (tLon) at which the second transistor turns on; and a second adjustment circuit (22) configured to change, starting with a second reference state where the fourth delay time is longer than the third delay time, at least one of the third and fourth delay times based on the difference between the third and fourth timing and thereby decrease a second dead time ($T_{DEAD2}$) between the turning-off of the first transistor and the turning-on of the second transistor. (A fourth configuration.)

It is thus possible to reduce a second dead time under varying conditions.

In the switching device of the fourth configuration described above (Practical Example EX1_A; sec FIGS. 5, 8, and 9), the first transistor (MH1) can be a P-channel field-effect transistor or a P-channel insulated-gate bipolar transistor and the second transistor (ML1) can be an N-channel field-effect transistor or an N-channel insulated-gate bipolar transistor. The second adjustment circuit (120 to 122) can include a variable delay circuit (122) configured to output an active signal (in the example in FIG. 8, a low-level S122) at the lapse of a variable time (Tdly_L1) from the change of the drive control signal to the first level. The switching control circuit can feed, based on the active signal, the second gate signal that raises the gate potential of the second transistor to the second transistor and thereby turn on the second transistor. The second adjustment circuit can decrease, starting with the second reference state, the variable time (Tdly_L1) in the variable delay circuit based on the difference between the third and fourth timings so as to decrease the fourth delay time (Td_Lon) and thereby decrease the second dead time ($T_{DEAD2}$). (A fifth configuration.)

It is thus possible to reduce a second dead time under varying conditions.

In the switching device of the fourth configuration described above (Practical Example EX2_A; see FIGS. 16, 19, and 20), the first and second transistors (MH2 and ML2) can both be N-channel field-effect transistors or N-channel insulated-gate bipolar transistors. The switching control circuit can include a level shifter (241) configured to shift the level of the drive control signal from a level relative to the ground potential to a level relative to the potential ($V_{LX}$) at the connection node between the first and second transistors and thereby generate a shifted drive control signal (S241). The switching control circuit can feed, in response to a change of the level of the shifted drive control signal based on the change of the drive control signal to the first level, the first gate signal that lowers the gate potential of the first transistor to the first transistor and thereby turn on the first transistor. The second adjustment circuit (220 to 222) can include a variable delay circuit (221) configured to output an active signal (in the example in FIG. 19, a low-level S221) at the lapse of a variable time (Tdly_L2) from the change of the drive control signal to the first level. The switching control circuit can feed, based on the active signal, the second gate signal that raises the gate potential of the second transistor to the second transistor and thereby turn on the second transistor. The second adjustment circuit can decrease, starting with the second reference state, the variable time (Tdly_L2) in the variable delay circuit based on the difference between the third and fourth timings so as to decrease the fourth delay time (Td_Lon) and thereby decreases the second dead time ($T_{DEAD2}$). (A sixth configuration.)

It is thus possible to reduce a second dead time under varying conditions.

In the switching device of the first configuration described above (see FIGS. 1 and 3 and FIG. 11 or 21), the adjustment circuit can be a first adjustment circuit (21). In response to a change of the level of the drive control signal from the second level to the first level, the switching control circuit can, at the lapse of a third delay time (Td_Hoff), turn off the first transistor and, at the lapse of a fourth delay time (Td_Lon), turn on the second transistor. The switching control circuit can further include: a third sense circuit (12H) configured to sense, based on the first gate signal, a third timing (tHoff) at which the first transistor turns off; a fourth sense circuit (12L) configured to sense, based on the second gate signal, a fourth timing (tLon) at which the second transistor turns on; and a second adjustment circuit (22; in FIGS. 11, 120 to 122; in FIGS. 21, 220 to 222) configured to adjust a second dead time between the turning-off of the first transistor and the turning-on of the second transistor based on a signal indicating the third timing, a signal indicating the fourth timing, and a signal corresponding to the potential at the connection node between the first and second transistors. (A seventh configuration.)

It is thus possible to adjust a second dead time optimally under varying conditions.

In the switching device of the seventh configuration described above (Practical Example EX1_B; see FIG. 11), the first transistor (MH1) can be a P-channel field-effect transistor or a P-channel insulated-gate bipolar transistor and the second transistor (ML1) can be an N-channel field-effect transistor or an N-channel insulated-gate bipolar transistor. The second adjustment circuit (120 to 122) can include a variable delay circuit (122) configured to output an active signal (in the example in FIG. 8, a low-level S122) at the lapse of a variable time (Tdly_L1) from the change of the drive control signal to the first level. The switching control circuit can feed, based on the active signal, the second gate signal that raises the gate potential of the second transistor to the second transistor and thereby turn on the second transistor. The second adjustment circuit can adjust, based on the signal (Hoff) indicating the third timing, the signal (Lon) indicating the fourth timing, and the signal (S135) corresponding to the potential ($V_{LX}$) at the connection node between the first and second transistors, the variable time (Tdly_L1) so as to adjust the fourth delay time (Td_Lon) and thereby adjust the second dead time ($T_{DEAD2}$). (An eighth configuration.)

It is thus possible to adjust a second dead time optimally under varying conditions.

In the switching device of the seventh configuration described above (Practical Example EX2_B; see FIG. 21), the first and second transistors (MH2 and ML2) can both be N-channel field-effect transistors or N-channel insulated-gate bipolar transistors. The switching control circuit can include a level shifter (241) configured to shift the level of the drive control signal from a level relative to the ground potential to a level relative to the potential ($V_{LX}$) at the connection node between the first and second transistors and thereby generate a shifted drive control signal (S241). The switching control circuit can feed, in response to a change of the level of the shifted drive control signal based on the change of the drive control signal to the first level, the first gate signal that lowers the gate potential of the first transistor to the first transistor and thereby turn off the first transistor. The second adjustment circuit (220 to 222) can include a variable delay circuit (221) configured to output an active signal (in the example in FIG. 19, a low-level S221) at the lapse of a variable time (Tdly_L2) from the change of the drive control signal to the first level. The switching control circuit can feed, based on the active signal, the second gate signal that raises the gate potential of the second transistor to the second transistor and thereby turn on the second transistor. The second adjustment circuit can adjust, based on the signal (Hoff) indicating the third timing, the signal (Lon) indicating the fourth timing, and the signal (S235) corresponding to the potential ($V_{LX}$) at the connection node between the first and second transistors, the variable time (Tdly_L2) so as to adjust the fourth delay time (Td_Lon) and thereby adjust the second dead time ($T_{DEAD2}$). (A ninth configuration.)

It is thus possible to adjust a second dead time optimally under varying conditions.

According to another aspect of what is disclosed herein, a DC/DC converter (2; see FIG. 4) includes: the switching device (1) of any of the first to ninth configurations described above; and a rectifying-smoothing circuit ($L_{OUT}$, $C_{OUT}$) configured to generate an output voltage ($V_{OUT}$) by rectifying and smoothing the voltage ($V_{LX}$) appearing at the connection node between the first and second transistors. The switching device includes a feedback control circuit (30) configured to generate the drive control signal based on a feedback voltage ($V_{FB}$) corresponding to the output voltage. (A tenth configuration.)

It is thus possible to optimize a delay time under varying conditions and to enhance the efficiency of a DC/DC converter.

The invention claimed is:

1. A switching device comprising:

a first transistor;

a second transistor disposed on a lower-potential side of the first transistor and connected in series with the first transistor; and a switching control circuit configured to turn on and off the first transistor by feeding the first transistor with a first gate signal and to turn on and off the second transistor by feeding the second transistor with a second gate signal according to a drive control signal, wherein in response to a change of a level of the drive control signal from a first level to a second level, the switching control circuit, at a lapse of a first delay time, turns on the first transistor and, at a lapse of a second delay time, turns off the second transistor, and the switching control circuit includes:

a first sense circuit configured to sense, based on the first gate signal, a first timing at which the first transistor turns on;

a second sense circuit configured to sense, based on the second gate signal, a second timing at which the second transistor turns off; and an adjustment circuit configured to change, starting with a reference state where the first delay time is longer than the second delay time, at least one of the first and second delay times based on a difference between the first and second timings and thereby decrease a dead time between a turning-off of the second transistor and a turning-on of the first transistor.

2. The switching device according to claim 1, wherein the first transistor is a P-channel field-effect transistor or a P-channel insulated-gate bipolar transistor and the second transistor is an N-channel field-effect transistor or an N-channel insulated-gate bipolar transistor, the adjustment circuit includes a variable delay circuit configured to output an active signal at a lapse of a variable time from the change of the drive control signal to the second level, the switching control circuit feeds, based on the active signal, the first gate signal that lowers a gate potential of the first transistor to the first transistor and thereby turns on the first transistor, and the adjustment circuit decreases, starting with the reference state, the variable time in the variable delay circuit based on the difference between the first and second timings so as to decrease the first delay time and thereby decreases the dead time.

3. The switching device according to claim 1, wherein the first and second transistors are both N-channel field-effect transistors or N-channel insulated-gate bipolar transistors, the switching control circuit includes a level shifter configured to shift the level of the drive control signal from a level relative to a ground potential to a level relative to a potential at a connection node between the first and second transistors and thereby generate a shifted drive control signal, the switching control circuit feeding, in response to a change of a level of the shifted drive control signal based on the change of the drive control signal to the second level, the first gate signal that raises the gate potential of the first transistor to the first transistor and thereby turning on the first transistor, the adjustment circuit includes a variable delay circuit configured to output an active signal at a lapse of a variable time from the change of the drive control signal to the second level, the switching control circuit feeds, based on the active signal, the second gate signal that lowers a gate potential of the second transistor to the second transistor and thereby turns off the second transistor, and the adjustment circuit increases, starting with the reference state, the variable time in the variable delay circuit based on the difference between the first and second timings so as to increase the second delay time and thereby decreases the dead time.

4. The switching device according to claim 1, wherein the adjustment circuit is a first adjustment circuit, in response to a change of the level of the drive control signal from the second level to the first level, the switching control circuit, at a lapse of a third delay time, turns off the first transistor and, at a lapse of a fourth delay time, turns on the second transistor, and the switching control circuit further includes:

a third sense circuit configured to sense, based on the first gate signal, a third timing at which the first transistor turns off;

a fourth sense circuit configured to sense, based on the second gate signal, a fourth timing at which the second transistor turns on; and a second adjustment circuit configured to change, starting with a second reference state where the fourth delay time is longer than the third delay time, at least one of the third and fourth delay times based on a difference between the third and fourth timing and thereby decrease a second dead time between a turning-off of the first transistor and a turning-on of the second transistor.

5. The switching device according to claim 4, wherein the first transistor is a P-channel field-effect transistor or a P-channel insulated-gate bipolar transistor and the second transistor is an N-channel field-effect transistor or an N-channel insulated-gate bipolar transistor, the second adjustment circuit includes a variable delay circuit configured to output an active signal at a lapse of a variable time from the change of the drive control signal to the first level, the switching control circuit feeds, based on the active signal, the second gate signal that raises a gate potential of the second transistor to the second transistor and thereby turns on the second transistor, and the second adjustment circuit decreases, starting with the second reference state, the variable time in the variable delay circuit based on the difference between the third and fourth timings so as to decrease the fourth delay time and thereby decreases the second dead time.

6. The switching device according to claim 4, wherein the first and second transistors are both N-channel field-effect transistors or N-channel insulated-gate bipolar transistors, the switching control circuit includes a level shifter configured to shift the level of the drive control signal from a level relative to a ground potential to a level relative to a potential at a connection node between the first and second transistors and thereby generate a shifted drive control signal, the switching control circuit feeding, in response to a change of a level of the shifted drive control signal based on the change of the drive control signal to the first level, the first gate signal that lowers the gate potential of the first transistor to the first transistor and thereby turning on the first transistor, the second adjustment circuit includes a variable delay circuit configured to output an active signal at a lapse of a variable time from the change of the drive control signal to the first level, the switching control circuit feeds, based on the active signal, the second gate signal that raises the gate potential of the second transistor to the second transistor and thereby turns on the second transistor, and the second adjustment circuit decreases, starting with the second reference state, the variable time in the variable delay circuit based on the difference between the third and fourth timings so as to decrease the fourth delay time and thereby decreases the second dead time.

7. The switching device according to claim 1, wherein the adjustment circuit is a first adjustment circuit, in response to a change of the level of the drive control signal from the second level to the first level, the switching control circuit, at a lapse of a third delay time, turns off the first transistor and, at a lapse of a fourth delay time, turns on the second transistor, and the switching control circuit further includes:

a third sense circuit configured to sense, based on the first gate signal, a third timing at which the first transistor turns off;

a fourth sense circuit configured to sense, based on the second gate signal, a fourth timing at which the second transistor turns on; and a second adjustment circuit configured to adjust a second dead time between a turning-off of the first transistor and a turning-on of the second transistor based on a signal indicating the third timing, a signal indicating the fourth timing, and a signal corresponding to a potential at the connection node between the first and second transistors.

8. The switching device according to claim 7, wherein the first transistor is a P-channel field-effect transistor or a P-channel insulated-gate bipolar transistor and the second transistor is an N-channel field-effect transistor or an N-channel insulated-gate bipolar transistor, the second adjustment circuit includes a variable delay circuit configured to output an active signal at a lapse of a variable time from the change of the drive control signal to the first level, the switching control circuit feeds, based on the active signal, the second gate signal that raises a gate potential of the second transistor to the second transistor and thereby turns on the second transistor, and the second adjustment circuit adjusts, based on the signal indicating the third timing, the signal indicating the fourth timing, and the signal corresponding to the potential at the connection node between the first and second transistors, the variable time so as to adjust the fourth delay time and thereby adjusts the second dead time.

9. The switching device according to claim 7, wherein the first and second transistors are both N-channel field-effect transistors or N-channel insulated-gate bipolar transistors, the switching control circuit includes a level shifter configured to shift the level of the drive control signal from a level relative to a ground potential to a level relative to a potential at a connection node between the first and second transistors and thereby generate a shifted drive control signal, the switching control circuit feeding, in response to a change of a level of the shifted drive control signal based on the change of the drive control signal to the first level, the first gate signal that lowers the gate potential of the first transistor to the first transistor and thereby turning off the first transistor, the second adjustment circuit includes a variable delay circuit configured to output an active signal at a lapse of a variable time from the change of the drive control signal to the first level, the switching control circuit feeds, based on the active signal, the second gate signal that raises the gate potential of the second transistor to the second transistor and thereby turns on the second transistor, and the second adjustment circuit adjusts, based on the signal indicating the third timing, the signal indicating the fourth timing, and the signal corresponding to the potential at the connection node between the first and second transistors, the variable time so as to adjust the fourth delay time and thereby adjusts the second dead time.

10. A DC/DC converter comprising:

the switching device according to claim 1; and a rectifying-smoothing circuit configured to generate an output voltage by rectifying and smoothing a voltage appearing at a connection node between the first and second transistors, wherein the switching device includes a feedback control circuit configured to generate the drive control signal based on a feedback voltage corresponding to the output voltage.

* * * * *